US012158433B2

(12) United States Patent
Laico et al.

(10) Patent No.: US 12,158,433 B2
(45) Date of Patent: Dec. 3, 2024

(54) DEVICE FOR OPTICAL INSPECTION OF PREFORMS

(71) Applicant: SACMI COOPERATIVA MECCANICI IMOLA SOCIETA' COOPERATIVA, Imola (IT)

(72) Inventors: Donato Laico, Imola (IT); Manuel Giorgi, Casola Valsenio (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 249 days.

(21) Appl. No.: 17/596,952

(22) PCT Filed: Jun. 26, 2020

(86) PCT No.: PCT/IB2020/056049
§ 371 (c)(1),
(2) Date: Dec. 22, 2021

(87) PCT Pub. No.: WO2020/261193
PCT Pub. Date: Dec. 30, 2020

(65) Prior Publication Data
US 2022/0307989 A1   Sep. 29, 2022

(30) Foreign Application Priority Data

Jun. 28, 2019   (IT) .......................... 102019000010416

(51) Int. Cl.
*B29C 49/42*   (2006.01)
*B29C 49/80*   (2006.01)
(Continued)

(52) U.S. Cl.
CPC ... *G01N 21/9009* (2013.01); *B29C 49/42065* (2022.05); *B29C 49/80* (2013.01);
(Continued)

(58) Field of Classification Search
CPC ........ B29L 2031/7158; B29K 2101/12; G01N 21/9081; G01N 21/8851; G01N 21/9009; B65G 15/14; B29C 49/80; B29C 49/42065
(Continued)

(56) References Cited

U.S. PATENT DOCUMENTS

| 7,541,556 B2 | 6/2009 | Canepa |
| 7,866,458 B2 | 1/2011 | Charpentier |
(Continued)

FOREIGN PATENT DOCUMENTS

| DE | 102010028500 A1 | 11/2011 |
| DE | 102017123888 | 9/2018 |
(Continued)

OTHER PUBLICATIONS

Krones, EP1568625B1, Inspection Machine With Device For Transporting Hollow Articles, European Patent Office (Year: 2006).*
(Continued)

*Primary Examiner* — Gene O Crawford
*Assistant Examiner* — Lester Rushin, III
(74) *Attorney, Agent, or Firm* — Pearne & Gordon LLP; Bryan M. Gallo

(57) ABSTRACT

An apparatus (1) and a method for optical inspection of parisons (2) made of thermoplastic material comprises: a conveyor (3) comprising a pair of lateral, under-flange guides 31A for holding each parison by its flange, and configured to transport the parisons (2) in succession along an inspection path; an inspection station (41, 42, 43, 51, 52), located along the inspection path and including at least one inspection camera (410, 411, 412, 413, 421, 431, 510, 511, 520, 521, 522), configured to capture image data of a parison (2) positioned in the inspection station (41, 42, 43, 51, 52), wherein the conveyor (3) has a first operating configuration
(Continued)

for transporting parisons (2) of a first size and a second operating configuration for transporting parisons (2) of a second size, different from the first size, the conveyor (3) including at least one adjustment actuator (7), configured to move the conveyor (3) between the first and the second operating configuration.

8 Claims, 12 Drawing Sheets

(51) Int. Cl.
  *B65G 15/14* (2006.01)
  *G01N 21/88* (2006.01)
  *G01N 21/90* (2006.01)
  *B29K 101/12* (2006.01)
  *B29L 31/00* (2006.01)

(52) U.S. Cl.
  CPC ......... *B65G 15/14* (2013.01); *G01N 21/8851* (2013.01); *G01N 21/9081* (2013.01); *B29K 2101/12* (2013.01); *B29L 2031/7158* (2013.01)

(58) Field of Classification Search
  USPC ...................................................... 198/339.1
  See application file for complete search history.

(56) References Cited

U.S. PATENT DOCUMENTS

| | | | |
|---|---|---|---|
| 10,357,915 | B2 | 7/2019 | Derrien et al. |
| 2006/0219609 | A1 | 10/2006 | Canepa |
| 2016/0122133 | A1* | 5/2016 | Härtel ................. B65G 47/295 198/459.6 |
| 2017/0129157 | A1* | 5/2017 | Derrien ................. B29C 49/78 |

FOREIGN PATENT DOCUMENTS

| | | | |
|---|---|---|---|
| EP | 1568625 B1 | 8/2006 | |
| EP | 1479454 | 7/2007 | |
| EP | 2112502 B1 | 2/2013 | |
| JP | 2004-271205 A | 9/2004 | |
| JP | 2008-531440 A | 8/2008 | |
| JP | 2009107690 A1 | 5/2009 | |
| JP | 2010-181225 A | 8/2010 | |
| JP | 2013-108816 A | 6/2013 | |
| JP | 2017-522202 A | 8/2017 | |
| JP | 7526182 B2 * | 7/2024 | ............. B29C 49/06 |
| WO | 2006092499 A1 | 9/2006 | |
| WO | 2012001414 | 1/2012 | |
| WO | WO-2013034096 A1 * | 3/2013 | ............. C09D 11/03 |
| WO | 2015193412 A1 | 12/2015 | |
| WO | 2019072436 | 4/2019 | |
| WO | 2020121239 A2 | 6/2020 | |

OTHER PUBLICATIONS

Voisin et al., WO 20103040096, Low Pearlescence Compositions, WIPO (Year: 2013).*
EP 1568625 A1 (Year: 2006).*
JP 2009107690 (Year: 2009).*
Notice of reasons for refusal of the Japanese Patent Office dated Jan. 10, 2023 for the parallel Japanese Application No. 2021-577471 and English translation thereof.
Office action from Canadian Patent Application No. 3,144,867, Dated Nov. 29, 2023, 8 pages.

* cited by examiner

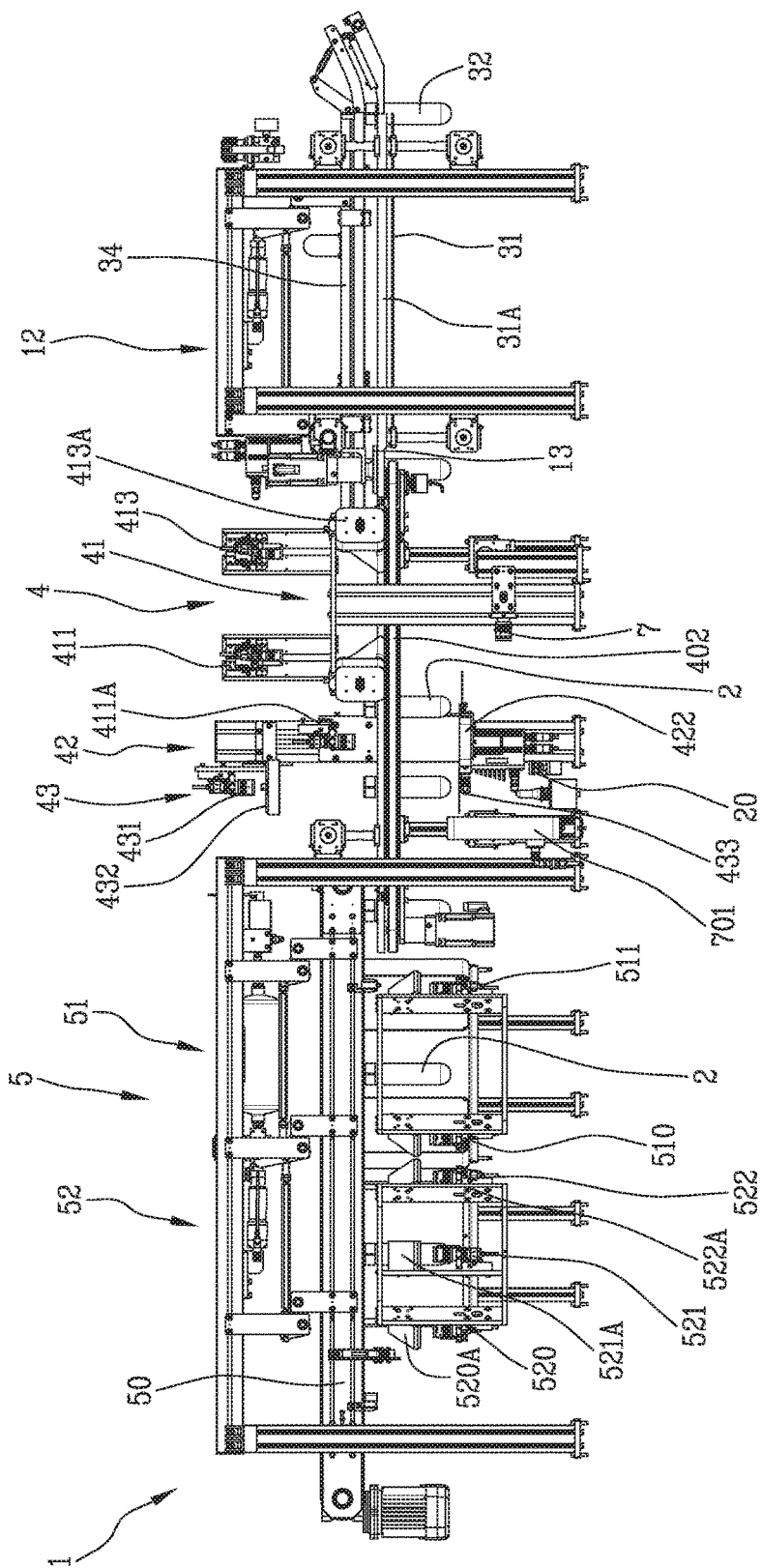

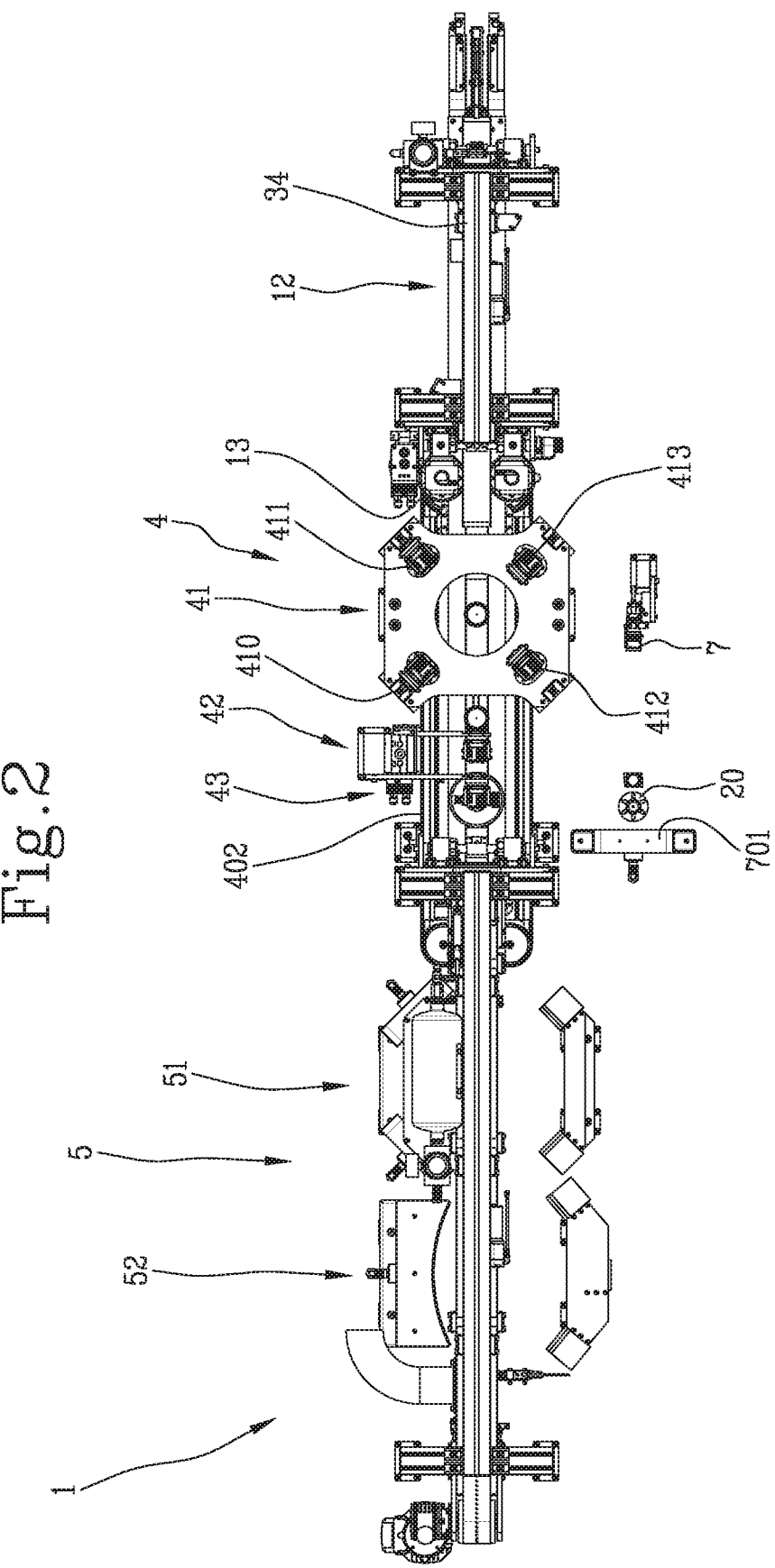

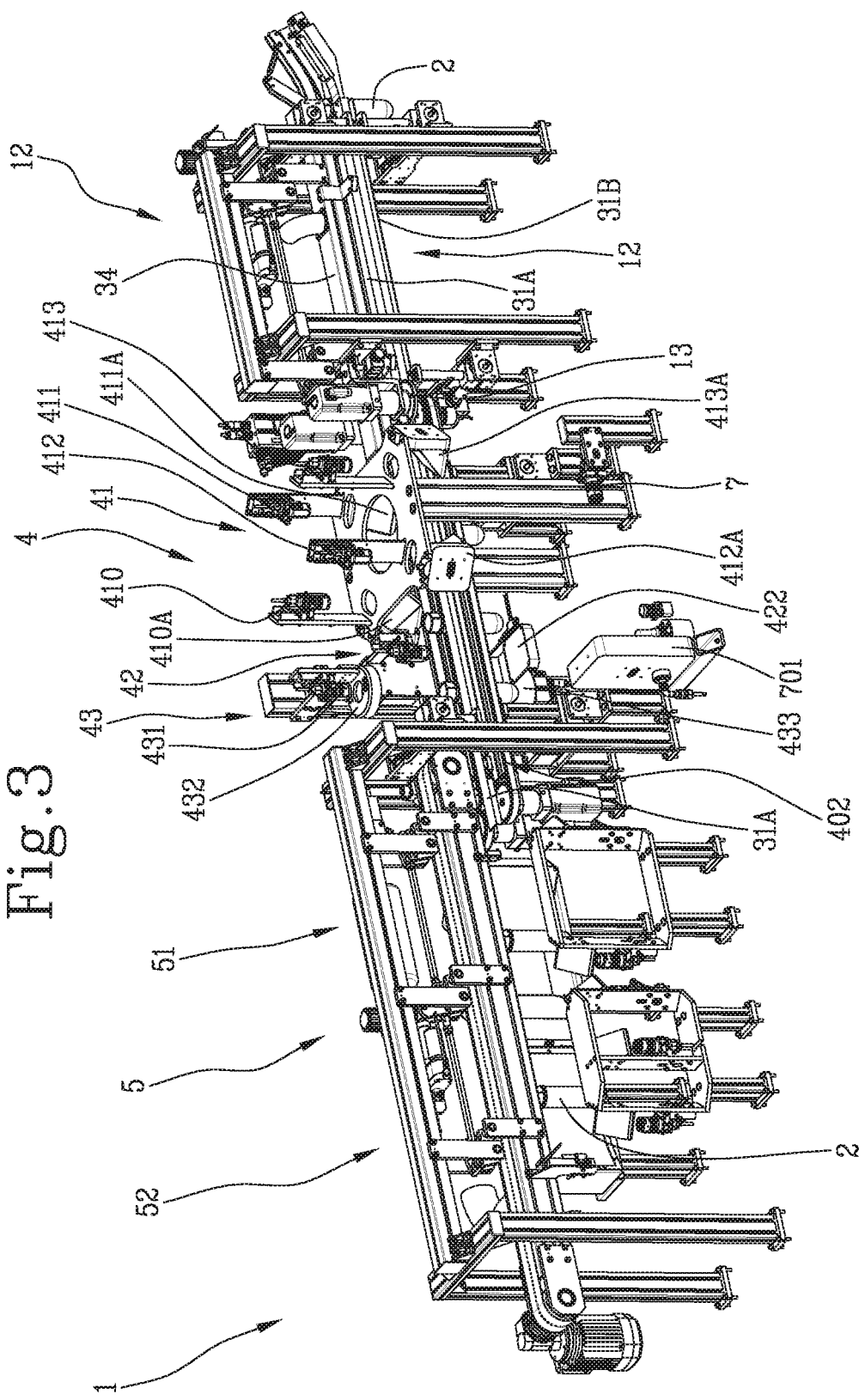

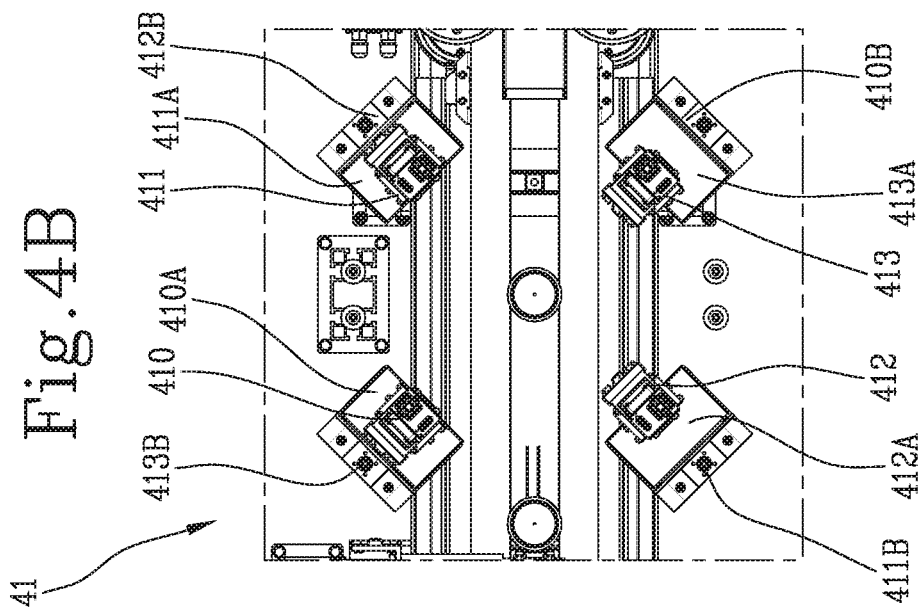
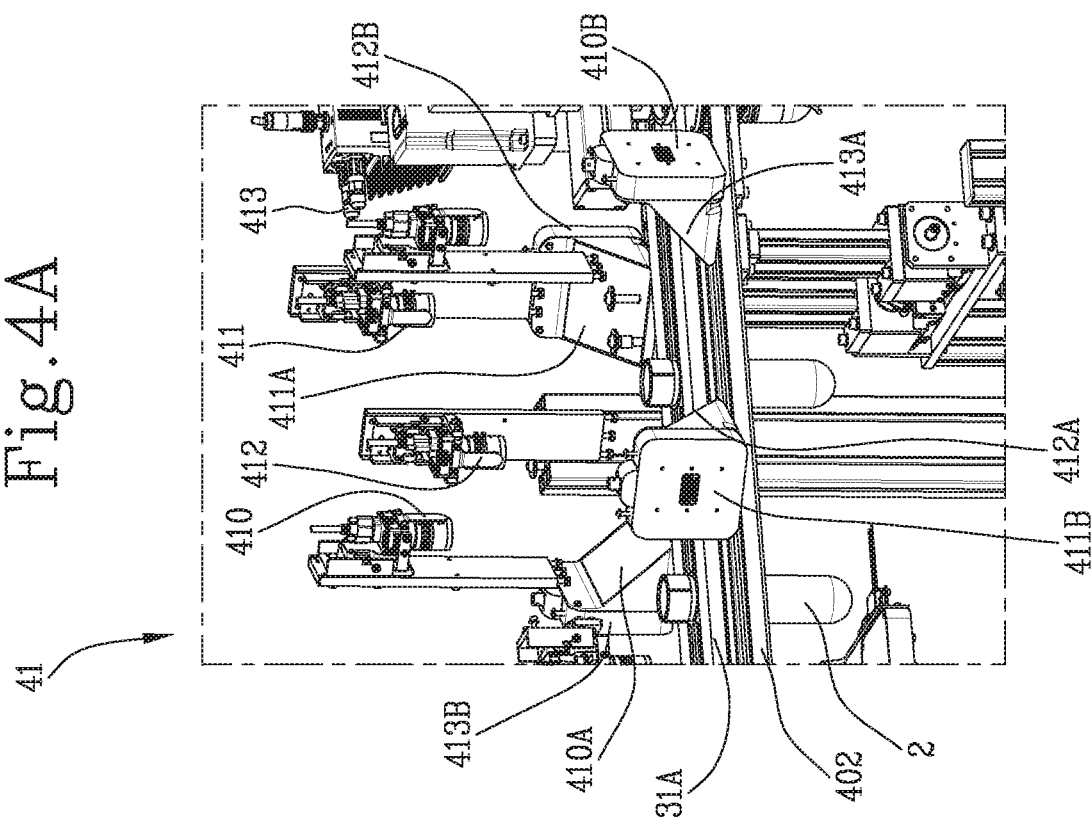

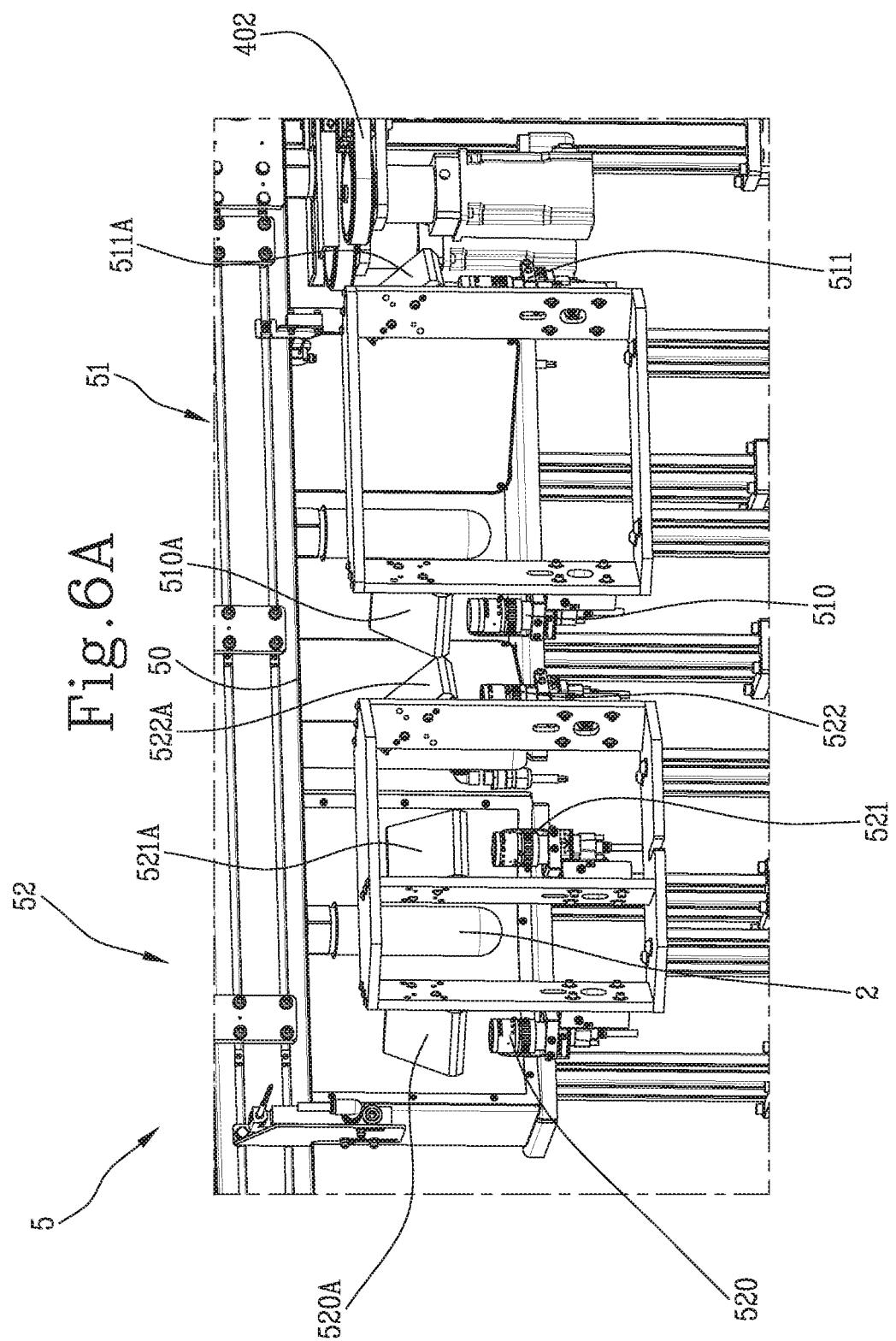

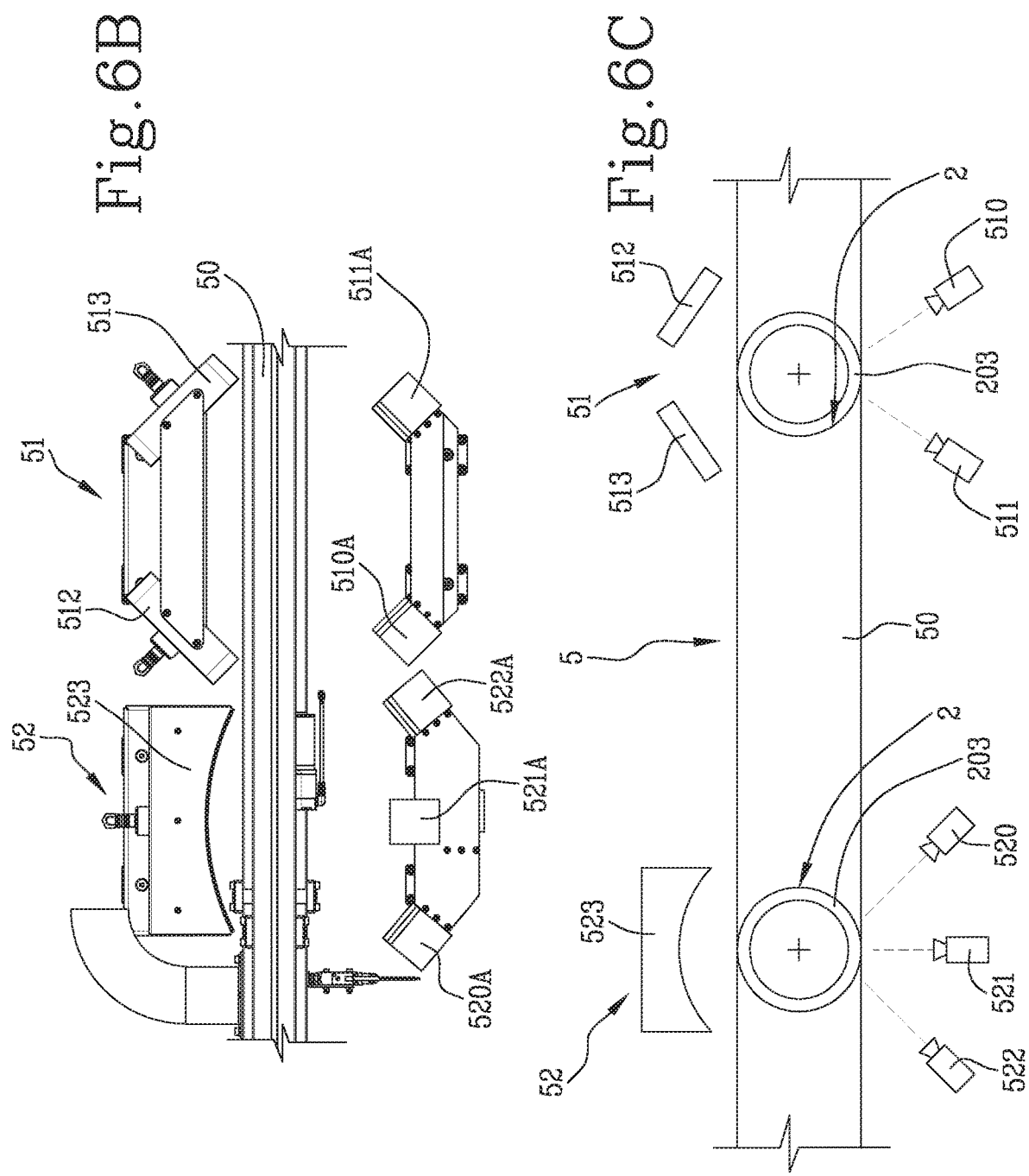

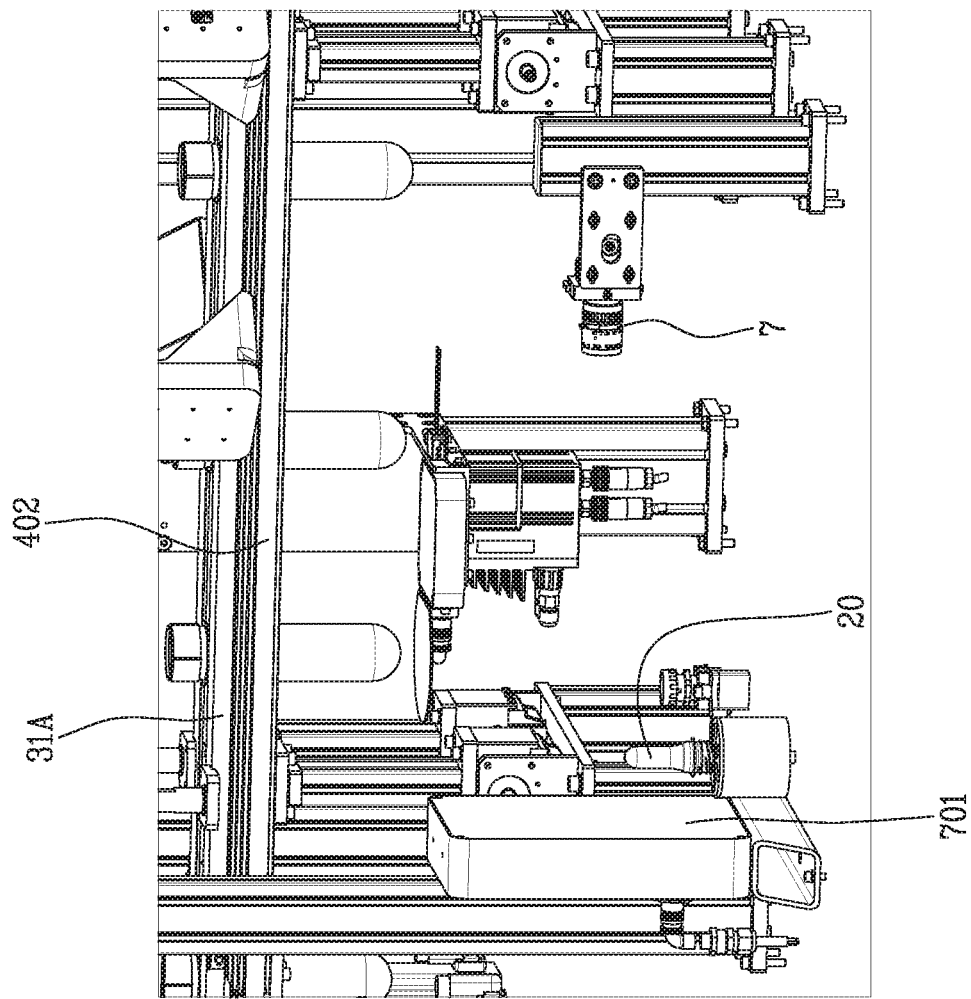

DEVICE FOR OPTICAL INSPECTION OF PREFORMS

TECHNICAL FIELD

This invention relates to an apparatus and a method for optical inspection of parisons made of thermoplastic material.

Lines for the production of plastic containers, specifically bottles, commonly comprise a moulding machine, configured to form parisons from PET (polyethylene terephthalate) and a blow-moulding machine configured to blow the parisons in moulds to make the containers. Some parisons may be flawed, for example by irregular thickness, holes, blisters or extraneous bodies; these flaws must be detected by a quality and/or process check intended to promptly remove the defective parisons from the production line.

BACKGROUND ART

Known from patent documents EP1479454B2, EP2112502B1, WO2019072436A1, EP15368625A1, WO2012/001414A2 and US2017/129157A1 are inspection apparatuses comprising a conveyor for transporting the parisons along an inspection path, an optical device, configured to capture images of the parisons being transported by the conveyor, and a pneumatic device, configured to place the internal cavity of each parison under a negative pressure; a control unit is responsible for comparing the image captured by the optical device with a standard image and for checking whether the negative pressure in the internal cavity remains unchanged for a predetermined length of time.

One drawback of prior art inspection apparatuses lies in the fact that the conveyor and the optical inspection devices have a fixed configuration which is used for parisons of all kinds and/or sizes. In effect, parisons come in different sizes, colours and/or materials; the quality of the images of the parisons captured by the optical devices varies according to the size of the parisons, thus limiting the reliability and precision of the inspection.

DISCLOSURE OF THE INVENTION

The aim of this invention is to provide an apparatus and a method for optical inspection of parisons to overcome the above mentioned drawbacks of the prior art.

This aim is fully achieved by the apparatus and method of this disclosure as characterized in the appended claims.

More specifically, this disclosure relates to an apparatus and a method for optical inspection of parisons made of thermoplastic material.

The term "parison" is used to denote an intermediate product in the process for the production of plastic containers such as, for example, beverage bottles. More specifically, parisons are formed by moulding the plastic material (typically injection or compression moulding) and, at a later stage, are expanded by blow-moulding to produce the finished containers. Parisons are made of plastic material, preferably PET (polyethylene terephthalate).

More generally speaking, this disclosure relates to an apparatus and a method for optical inspection of objects; by objects is meant parisons, caps, cans and/or jars.

The apparatus comprises a conveyor, configured to transport the parisons in succession along an inspection path.

The apparatus comprises an inspection station (at least one), disposed along the inspection path. In an embodiment, the apparatus comprises a plurality of inspection stations, disposed along the inspection path. What is described below with reference to one inspection station applies, with the necessary changes made, to each inspection station of the plurality of inspection stations.

The inspection station includes at least one inspection camera, configured to capture image data of a parison (or a part thereof) positioned in the inspection station.

The apparatus has (at least) a first operating configuration, for inspecting parisons of a first size, and a second operating configuration, for inspecting parisons of a second size, different from the first size. In an embodiment, the apparatus can be set to a plurality of operating configurations. The apparatus includes an adjustment system, configured to move the apparatus between the first and the second operating configuration (or between the plurality of operating configurations).

In an embodiment, the conveyor has (at least) a first operating configuration, for transporting parisons of the first size, and a second operating configuration, for transporting parisons of the second size. In an embodiment, the conveyor can be set to a plurality of operating configurations, depending on the size of the parisons to be inspected.

The conveyor (or the adjustment system) includes at least one adjustment actuator. In an embodiment, the adjustment actuator is an electrical actuator.

In an embodiment, the adjustment actuator is configured to move the conveyor between the first and the second operating configuration (or between the plurality of operating configurations).

In an embodiment, the first operating configuration of the conveyor defines the first operating configuration of the apparatus and the second operating configuration of the conveyor defines the second operating configuration of the apparatus.

In an embodiment, the inspection station has (at least) a first operating configuration, for inspecting parisons of the first size, and a second operating configuration, for inspecting parisons of the second size. In an embodiment, the inspection station can be set to a plurality of operating configurations, depending on the size of the parisons to be inspected.

In an embodiment, the apparatus includes an (additional) adjustment system, configured to move the inspection station between the first and the second operating configuration (or between the plurality of operating configurations).

In an embodiment, the apparatus (or the adjustment system) includes a plurality of adjustment actuators; each adjustment actuator of the plurality is configured to change an operating configuration of the conveyor or of the inspection station.

In an embodiment, the first operating configuration of the inspection station defines the first operating configuration of the apparatus and the second operating configuration of the inspection station defines the second operating configuration of the apparatus.

In an embodiment, the operating configuration of the conveyor and the operating configuration of the inspection station define, in combination, a corresponding operating configuration of the apparatus (of the plurality of operating configurations of the apparatus).

The possibility of modifying the operating configuration of the apparatus (and more specifically, of the conveyor and/or of the inspection station), improves the precision and quality of the inspections performed on parisons of different kinds and sizes. In an embodiment, adjusting the apparatus from one operating configuration to another can be done manually by an operator using adjustment actuators such as handwheels, for example.

In an embodiment, the conveyor includes a plurality of feed mechanisms configured to support and move the parisons along the inspection path. The plurality of feed mechanisms may, for example, include guides (under-flange guides, and/or body guides), bands and/or belts. The feed mechanisms are movable between a plurality of operating configurations to define the operating configuration of the conveyor.

The apparatus comprises a control unit. The control unit is connected to the adjustment actuator (that is, to the adjustment system). The control unit is configured to control the at least one adjustment actuator of the conveyor and/or of the inspection station.

The possibility of automatically setting the operating configurations using the adjustment actuator makes setting quicker and more precise.

The control unit is configured to synchronously control the adjustment actuator of the conveyor and the (additional) adjustment actuator of the inspection station.

The control unit is configured to synchronously control the plurality of adjustment actuators, each of which is configured to change an operating configuration of the conveyor or of the inspection station.

In particular, in an embodiment, the conveyor includes a plurality of adjustment actuators; the control unit may be configured to synchronously control the plurality of adjustment actuators of the conveyor.

In an embodiment, the inspection station includes a plurality of adjustment actuators; the control unit may be configured to synchronously control the plurality of adjustment actuators of the inspection station.

In an embodiment, the conveyor includes a respective plurality of adjustment actuators and the inspection station includes a respective plurality of adjustment actuators; the control unit may be configured to synchronously control the plurality of adjustment actuators of the conveyor and the plurality of adjustment actuators of the inspection station.

In an embodiment, controlling the adjustment actuator (or actuators) both automatically and manually is also imaginable. For example, it might be possible to carry out a first adjustment automatically and to then fine tune it manually.

In an embodiment, the control unit is configured to receive input data representing a size (or a type) of parison to be inspected. The input data may include dimensional characteristics of the parisons to be inspected (for example, flange diameter, body diameter, height of thread, under flange diameter, height of body; height of seal-breaking ring, if any), and/or information regarding the material of the parisons to be inspected (for example, information regarding the colour).

In an embodiment, the control unit is configured to process the input data to derive a setting dataset as a function of the size of the parisons to be inspected. The setting dataset defines a corresponding operating configuration of the apparatus. More specifically, the setting dataset defines a corresponding operating configuration of the conveyor. In an embodiment, the setting dataset defines a corresponding operating configuration of the inspection station (that is, of the inspection camera).

In an embodiment, the control unit is configured to generate an adjustment signal as a function of the setting dataset. The adjustment signal is responsible for controlling the movement of the at least one adjustment actuator of the apparatus. In an embodiment, the adjustment signal is responsible for controlling the movement of the at least one adjustment actuator of the conveyor. In an embodiment, the adjustment signal is responsible for controlling the movement of the at least one adjustment actuator of the inspection station.

In an embodiment, the apparatus comprises an interface configured to communicate the setting dataset to an operator. In this embodiment, the setting dataset may include adjustment instructions to assist the operator in manually adjusting the conveyor and/or the inspection station (the adjustment instructions being configured to tell the operator which operating configuration to set).

In an embodiment, the apparatus comprises a recognition camera. The recognition camera is configured to capture an image of (at least) one of the parisons to be inspected (or of a part thereof). In an embodiment, the recognition camera is located upstream of the inspection path. In an embodiment, the recognition camera is located upstream of the conveyor. In an embodiment, the recognition camera is located upstream of the inspection station. The recognition camera is connected to the control unit. The control unit is configured to process the image captured by the recognition camera. In an embodiment, the control unit is configured to derive the input data from the image captured by the recognition camera. Thus, through the recognition camera, the apparatus automatically recognizes the parison to be inspected.

In an embodiment, the control unit has access (that is, is connected) to a memory and/or to a database. In an embodiment, the memory coincides with the database.

In an embodiment, the control unit includes an artificial intelligence system configured to derive the setting dataset. In an embodiment, the control unit is configured to store the setting dataset in the database. That way, each time parisons of a new size are inspected, new setting datasets are added to enhance the database.

In an embodiment, the setting dataset is correlated with the parison size. In an embodiment, the database includes a plurality of fields (or records), where each field is associated with the size of the parisons and includes the setting dataset.

In an embodiment, the control unit has access to a memory containing a plurality of setting datasets. In an embodiment, the inspection data represent a corresponding plurality of operating configurations of the conveyor (and/or of the inspection station), each of which corresponds to a respective parison size.

In an embodiment, the control unit is configured to query the memory to (select and) retrieve the setting dataset as a function of the input data; the setting dataset selected and retrieved relates to a predetermined operating configuration of the conveyor for the size of the parisons to be inspected.

The control unit queries the memory to check whether the memory already contains a setting dataset for the size of the parisons to be inspected; if it does (that is, if an existing setting dataset is found), the control unit is configured to derive the setting dataset by retrieving it from the memory; if it doesn't (that is, if an existing setting dataset is not found), the control unit is configured to derive a new setting dataset—for example, by means of an artificial intelligence system—suitable for the size of the parisons to be inspected; optionally, the control unit is configured to store the newly derived setting dataset in the memory.

In an embodiment, the apparatus comprises one or more proximity sensors. In an embodiment, the one or more proximity sensors are associated with the conveyor; in this embodiment, the one or more proximity sensors are configured to detect the position of the conveyor (or a part thereof)

relative to a parison to be inspected. In an embodiment, the one or more proximity sensors are associated with the inspection station; in this embodiment, the one or more proximity sensors are configured to detect the position of the conveyor (or a part thereof) relative to a parison to be inspected. In an embodiment, the control unit is configured to receive one or more signals from the one or more proximity sensors and to process the one or more signals in order to derive the setting dataset.

In an embodiment, the control unit is configured to compare the image data captured by the inspection camera with reference data relating to a reference position of the parisons relative to the conveyor, in order to derive a correction signal in response to the comparison between the image data and the reference data.

In an embodiment, the control unit is configured to receive a feedback signal, representing an effective operating configuration of the conveyor and/or of the inspection station; to process the acknowledgement signal as a function of a predetermined criterion; and to generate the correction signal as a function of the acknowledgement signal and of the predetermined criterion. Thus, the correction signal is configured to check the operating configuration of the conveyor and/or of the inspection station by feedback.

In an embodiment, the predetermined criterion includes the reference data relating to the reference position of the conveyor and/or of the inspection station, and a tolerance threshold relative to the reference position.

In an embodiment, the predetermined criterion includes one or more mathematical formulas which, according to the size of the parison, determine the operating configuration of the conveyor and/or of the inspection station (for example, they determine the distance between the side guides that support the parison by the flange as a function of the diameter of the flange and/or of the under-flange diameter) and/or the distance between the parison body guides, which guide the body of the parison along the inspection path.

In an embodiment, the correction signal is configured to drive the at least one adjustment actuator of the conveyor. The control unit is configured to send the correction signal to the adjustment actuator of the conveyor to correct the operating position (configuration) of the conveyor.

In an embodiment, the correction signal represents a setting of the inspection station. The control unit is configured to send the correction signal to the adjustment actuator of the inspection station to correct the operating position (configuration) of the inspection station.

In an embodiment, the correction signal represents a correction to be applied to the image data (that is to say, an updated version of the image data). The control unit is programmed to correct the image data captured according to that correction, replacing them with the updated version. In this embodiment, therefore, the control unit applies the correction directly on the image.

In an embodiment, the control unit is configured to update the setting dataset stored in the database, as a function of the correction signal.

In an embodiment, the input data include one or more of the features in the following list: flange diameter of the parison, under-flange diameter of the parison; height of thread of the parison, diameter of the body of the parison; body height; height of seal breaking ring of the parison; colour of the parison, material the parison is made of, thickness of parison body; depth of parison thread.

In an embodiment, the inspection station includes an illuminator, configured to direct a light beam at the parison positioned in the inspection station.

In an embodiment, the at least one inspection camera is movable relative to the conveyor between a first position and a second position (or between a plurality of positions).

In an embodiment, the plurality of operating configurations of the inspection station includes a first operating configuration, where the at least one inspection camera is at the first position, and a second operating configuration, where the at least one inspection camera is at the second position, different from the first position. In an embodiment, the first and second positions are defined relative to a fixed (or absolute) reference system. In an embodiment, the first and second positions are defined relative to the conveyor. Preferably, the apparatus comprises an inspection station movement system, configured to move said at least one inspection camera between the first and second position (relative to a fixed reference system and/or relative to the conveyor). Hence, said at least one inspection camera is movable. In particular, if the inspection station comprises a plurality of inspection cameras, at least one of said inspection cameras is movable. The inspection station movement system may comprise a carriage on which said at least one inspection camera is mounted, the carriage being movable, for example, along the vertical direction.

Each parison includes a body, a thread and a flange. The thread defines an open annular end. The body (cylindrical in shape) extends between the thread and a closed bottom and defines an internal cavity. The flange is interposed between the thread and the body. The flange projects radially from the body.

In an embodiment, the conveyor includes a pair of under-flange guides, configured to support the parisons by holding them up by the flange. The under-flange guides of the pair are movable towards and away from each other to vary the distance between them. In an embodiment, the adjustment actuator of the conveyor is configured to move the pair of under-flange guides, to define the first and second operating configurations of the conveyor (or to define a respective operating configuration of the plurality of operating configurations).

In an embodiment, the conveyor includes a pair of body guides, configured to guide the parisons (supported by the under-flange guides), with bodies side by side, to keep them securely in the upright position along the feed path (with the axis of the parison oriented along the vertical direction). In an embodiment, the adjustment actuator of the conveyor is configured to move the pair of body guides, to define the first and second operating configurations of the conveyor (or to define a respective operating configuration of the plurality of operating configurations).

In an embodiment, the conveyor includes a feed channel associated with (preferably above) the (under-flange) guides of the pair. The feed channel is configured to convey a jet of air (or other gas); the feed channel includes a plurality of directed openings, defined in a bottom wall of the channel, in contact with the parisons (more specifically, the bottom wall of the channel is in contact with an upper edge of the parisons). The air jet conveyed in the channel comes out though the directed openings, in a direction defined by the shape of the directed openings in order to push the parisons, making them advance along the (under-flange) guides of the pair. In an embodiment, the feed channel is movable along a vertical direction, at right angles to the pair of guides, towards and away from the pair of guides. In an embodiment, the adjustment actuator of the conveyor is configured to move the feed channel along the vertical direction, to define the first and second operating configurations of the conveyor (or to define a respective operating configuration of the plurality of operating configurations).

In an embodiment, the conveyor includes a pair of feed belts, configured to contact the outside of the parison body to cause the parisons to advance along the (under-flange) guides of the pair. The feed belts of the pair are movable towards and away from each other to vary the distance between them. In an embodiment, the adjustment actuator of the conveyor is configured to move the feed belts towards and away from each other to define the first and second operating configurations (or to define a respective operating configuration of the plurality of operating configurations).

In an embodiment, the conveyor includes a suction belt. The suction belt is configured to advance along a feed direction. The suction belt is configured to contact the open annular end of the parisons and to create a negative pressure (that is, a vacuum) in the internal cavity of the parisons, so as to support and move them in the feed direction. The suction belt is movable (in particular along the vertical direction). In an embodiment, the adjustment actuator of the conveyor is configured to move the suction belt, to define the first and second operating configurations of the conveyor (or to define a respective operating configuration of the plurality of operating configurations).

This disclosure also provides a line for making containers from thermoplastic material.

In an embodiment, the line comprises a moulding machine configured to make parisons. In an embodiment, the moulding machine is an injection moulding machine. In an embodiment, the moulding machine is a compression moulding machine (which may be a rotary machine).

In an embodiment, the line comprises a thermal conditioning unit to heat and/or cool the parisons. For convenience of description, the thermal conditioning unit is hereinafter referred to as a "heating oven" without thereby limiting the scope of the disclosure. The heating oven is configured to receive the parisons feeding out of the moulding machine and is equipped with heating means for heating the parisons.

In an embodiment, the line comprises a blow-moulding machine configured to receive the parisons and to blow-mould them in moulds to make the containers. Preferably, the blow-moulding machine is configured to receive the parisons heated in the heating oven. The oven might be integrated in the blow-moulding machine.

In an embodiment, the blow-moulding machine and the parison moulding machine might be located in different lines (even installed in separate factories) working in conjunction to make containers of thermoplastic material: in effect, the moulding machine makes parisons which are fed into the line that includes the blow-moulding machine. The oven is preferably integrated in the line that includes the blow-moulding machine, upstream of the blow-moulding machine to heat the parisons before blow-moulding them.

In an embodiment, the line comprises a storage unit (which may be automatic) to receive the parisons and store them; the storage unit is configured to receive the parisons from the moulding machine and to feed them to the blow-moulding machine—or to the oven.

In an embodiment, the line comprises an apparatus for optical inspection of parisons according to one or more aspects of this disclosure.

The optical inspection apparatus is located in the line, downstream of the moulding machine. The optical inspection apparatus is located in the line, upstream of the blow-moulding machine. In an embodiment, the optical inspection apparatus is operatively located downstream of the moulding machine and upstream of the oven. In an embodiment, the optical inspection apparatus is operatively located downstream of the oven and upstream of the blow-moulding machine. The fact that the apparatus is located upstream of the blow-moulding machine allows identifying defective parisons before they explode during blow-moulding on account of their anomalous stress profiles. In an embodiment, the optical inspection apparatus might be positioned in the storage unit or on a conveyor connecting the storage unit to other parts of the line.

In an embodiment, the optical inspection apparatus is located on the line in such a way as to inspect the parisons at a temperature of between 30 and 70 degrees Celsius (preferably between 50 and 60 degrees Celsius). The parisons may be at this temperature when they exit the moulding machine, for example.

In an embodiment, the optical inspection apparatus is located on the line in such a way as to inspect the parisons at an ambient temperature (for example, between 5 and 30 degrees Celsius). The parisons may be at ambient temperature if they are stored or cooled after moulding.

Preferably, the optical inspection apparatus is located on the line in such a way as to inspect the parisons at a temperature below 60 degrees Celsius (preferably below 50 degrees Celsius); in effect, at higher temperatures, the parisons might be subject to deformation which could alter their stress profiles.

In other embodiments, the optical inspection apparatus according to this disclosure is located off line, integrated in a high-speed testing machine or in a low-speed sampling machine.

This disclosure also provides a method for optical inspection of parisons.

The method comprises a step of conveying the parisons to be inspected in succession (that is, in sequence) along an inspection path, by means of a conveyor.

The method comprises a step of capturing image data of a parison positioned in an inspection station by means of an inspection camera (at least one).

In an embodiment, the method comprises a step of moving the conveyor, by means of at least one adjustment actuator, between a first operating configuration, where the conveyor transports parisons of a first size, and a second operating configuration, where the conveyor transports parisons of a second size, different from the first size.

In an embodiment, the method comprises a step of moving the conveyor to a respective operating configuration of a plurality of operating configurations, depending on the size of the parisons.

In an embodiment, the method comprises a step of moving the inspection station, by means of at least one adjustment actuator, between a first operating configuration, to inspect parisons of a first size, and a second operating configuration, to inspect parisons of a second size, different from the first size.

In an embodiment, the method comprises a step of moving the inspection station to a respective operating configuration of a plurality of operating configurations, depending on the size of the parisons.

In an embodiment, the method (or rather, the step of moving the conveyor) comprises a step of receiving input data, representing a size of the parisons to be inspected.

In an embodiment, the method (or rather, the step of moving the conveyor) comprises a sub-step of processing the input data and, as a function of the size of the parisons to be inspected, deriving a setting dataset defining a corresponding operating configuration of the conveyor.

In an embodiment, the method (or rather, the step of moving the conveyor) comprises a sub-step of generating an adjustment signal as a function of the setting dataset.

In an embodiment, the method (or rather, the step of moving the conveyor) comprises a sub-step of sending the adjustment signal to the at least one adjustment actuator of the conveyor to control the movement thereof.

In an embodiment, the method (or rather, the step of moving the conveyor) comprises a sub-step of capturing an image of one of the parisons to be inspected (or a part thereof) by means of a recognition camera.

In an embodiment, the method (or rather, the step of moving the conveyor) comprises a step of deriving the input data, representing a size of the parisons to be inspected, as a function of the image captured by the recognition camera.

In an embodiment, the method comprises a step of deriving a correction signal. In an embodiment, the correction signal is derived as a function of comparing the image data captured by the at least one camera with reference data relating to a reference position of the parisons relative to the conveyor and/or to the inspection station. In an embodiment, the correction signal is derived as a function of a signal captured by a proximity sensor, configured to detect the position of the conveyor (or a part thereof) or of the inspection station (or a part thereof) relative to one or more parisons to be inspected.

BRIEF DESCRIPTION OF DRAWINGS

These and other features will become more apparent from the following detailed description of a preferred embodiment, illustrated by way of non-limiting example in the accompanying drawings, in which:

FIG. 1 shows a side view of an inspection apparatus according to this disclosure;

FIG. 2 shows a top view of the apparatus of FIG. 1;

FIG. 3 shows a perspective view of the apparatus of FIG. 1;

FIGS. 4A, 4B and 4C are, respectively, a perspective view, a top view and a schematic view of a first inspection segment of the apparatus of FIG. 1;

FIGS. 6A, 6B and 6C are, respectively, a perspective view, a top view and a schematic view of a second inspection segment of the apparatus of FIG. 1;

FIG. 7 illustrates an additional station of the apparatus of FIG. 1, for detecting the dimensions of a parison;

DETAILED DESCRIPTION OF PREFERRED EMBODIMENTS OF THE INVENTION

Figure 5:
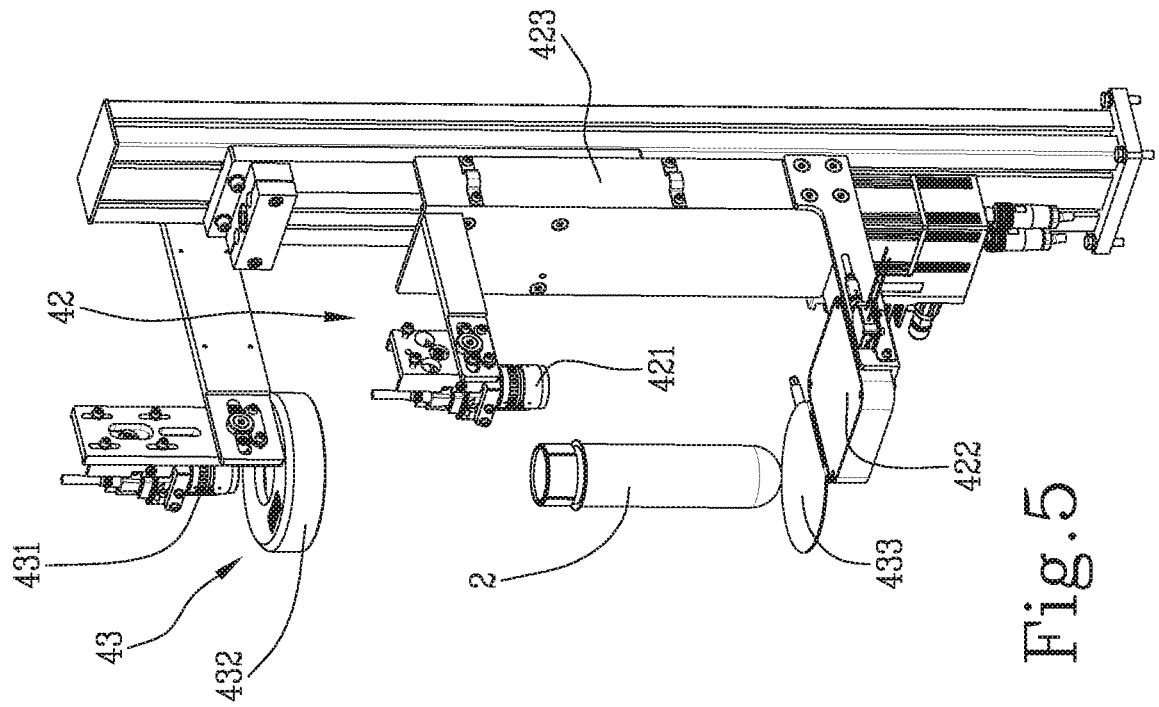
FIG. 5 illustrates a second and a third inspection station of the first inspection segment of the apparatus of FIG. 1.
Figure 4C:
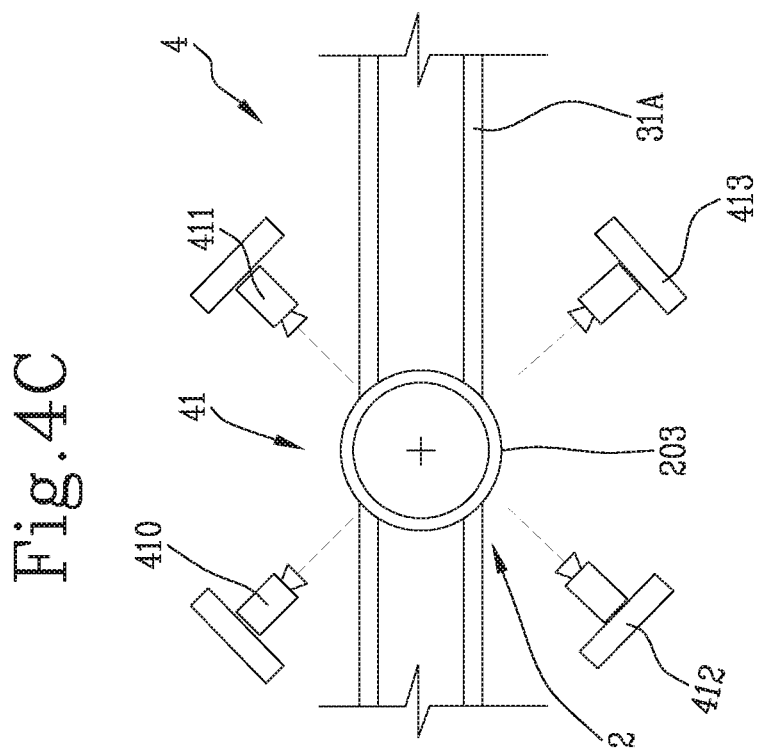
Figure 8:
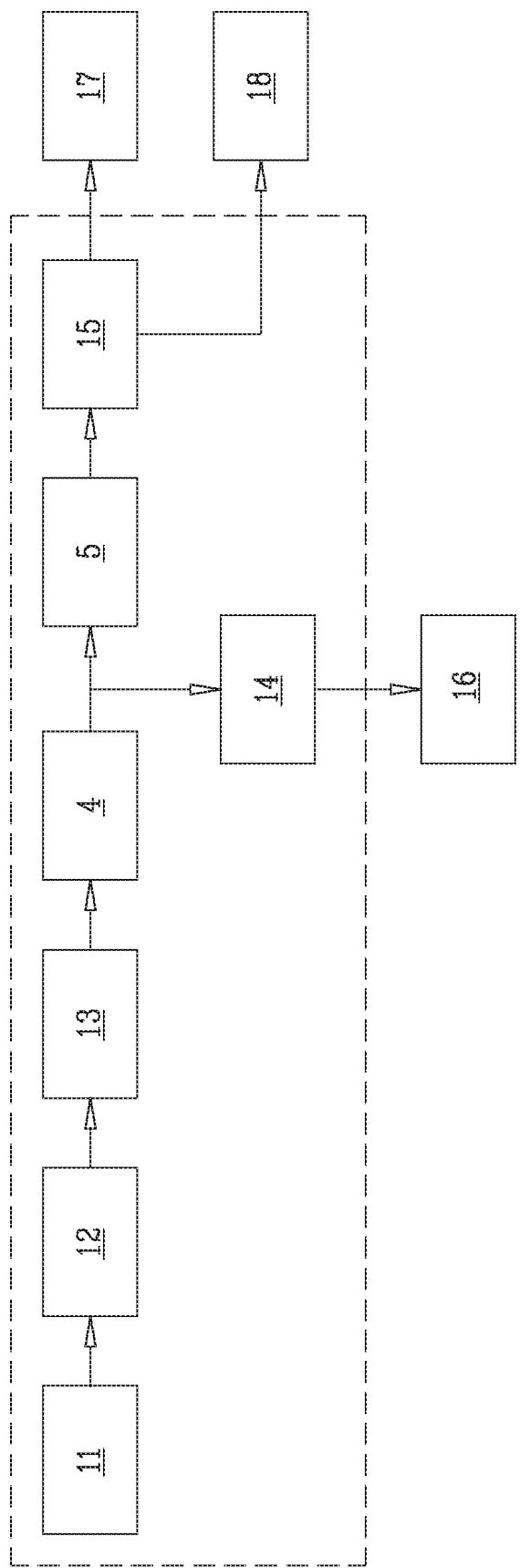
FIG. 8 schematically illustrates the apparatus of FIG. 1.
Figure 9:
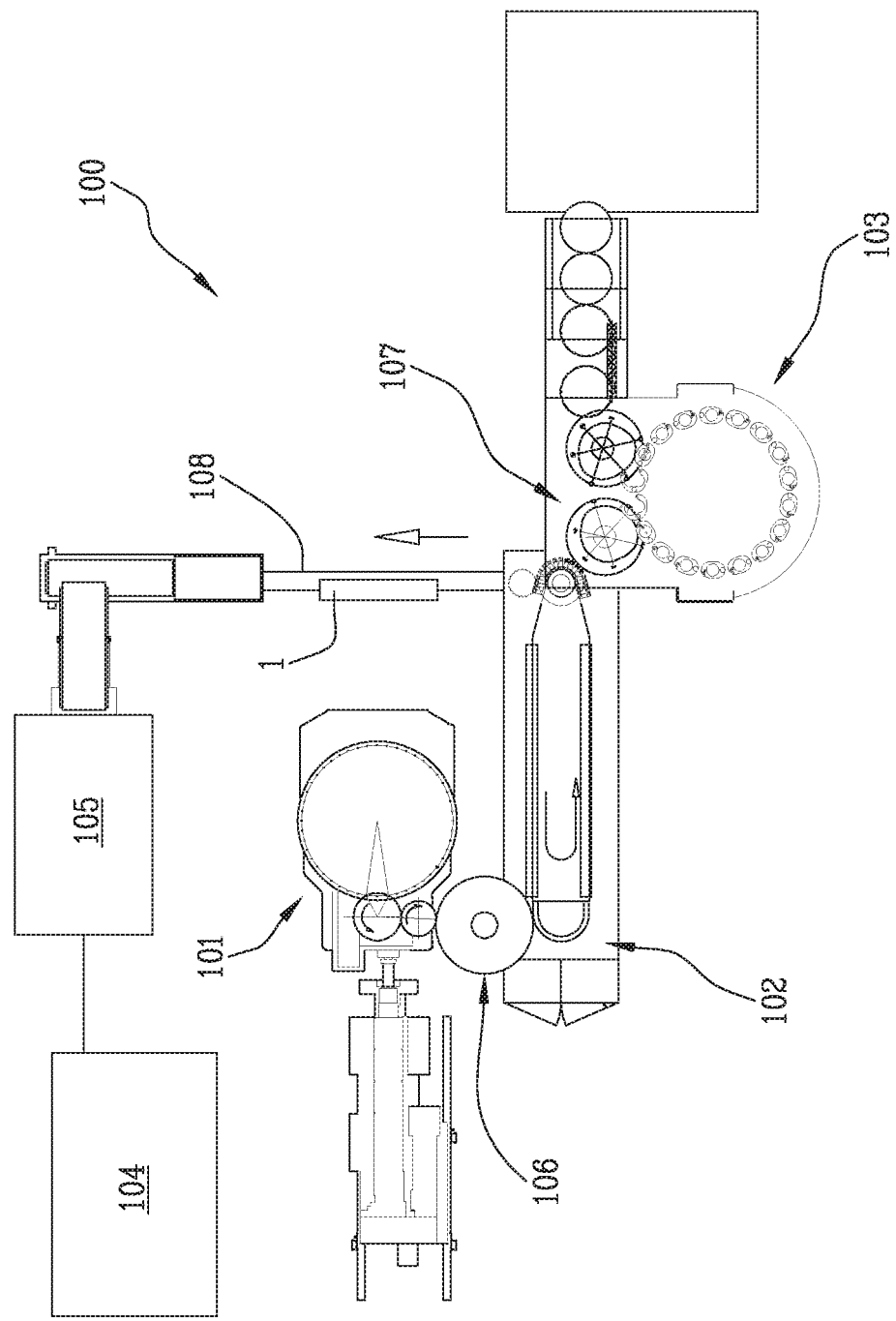
FIG. 9 illustrates a line comprising the apparatus of FIG. 1.
Figure 10:
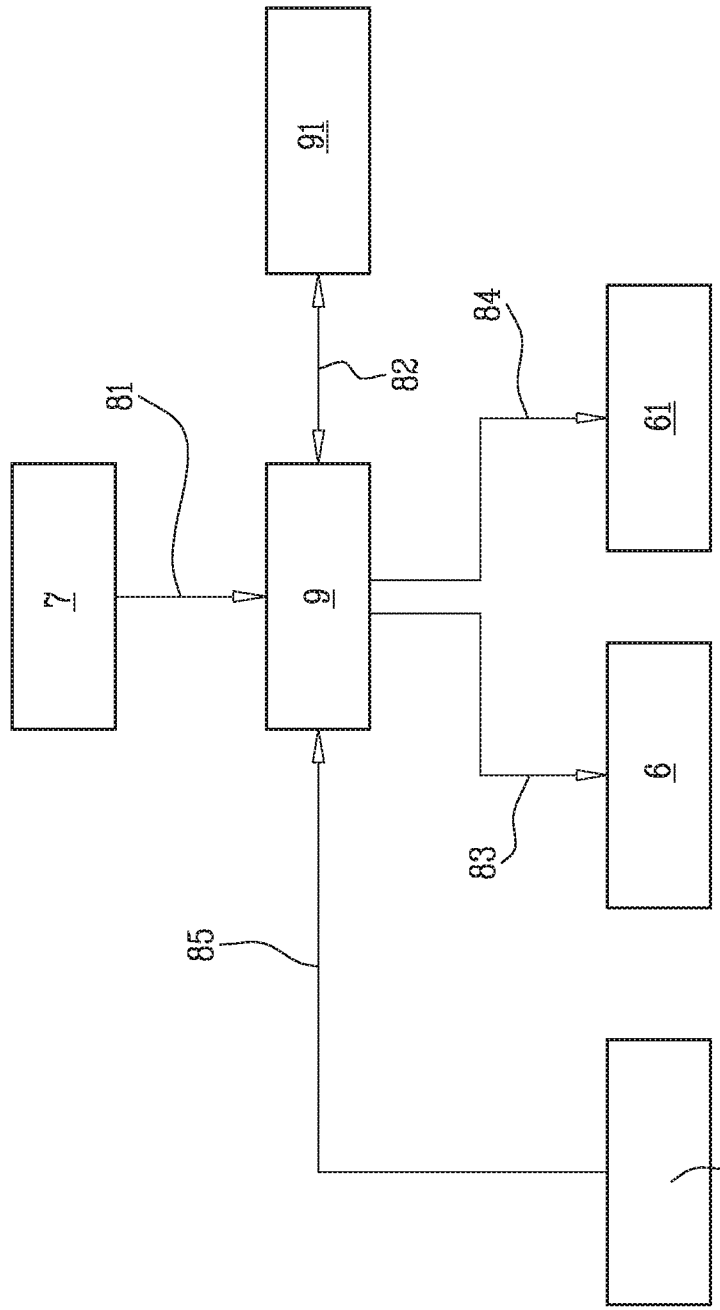
FIG. 10 schematically illustrates the operation of the apparatus of FIG. 1.
Figure 11:
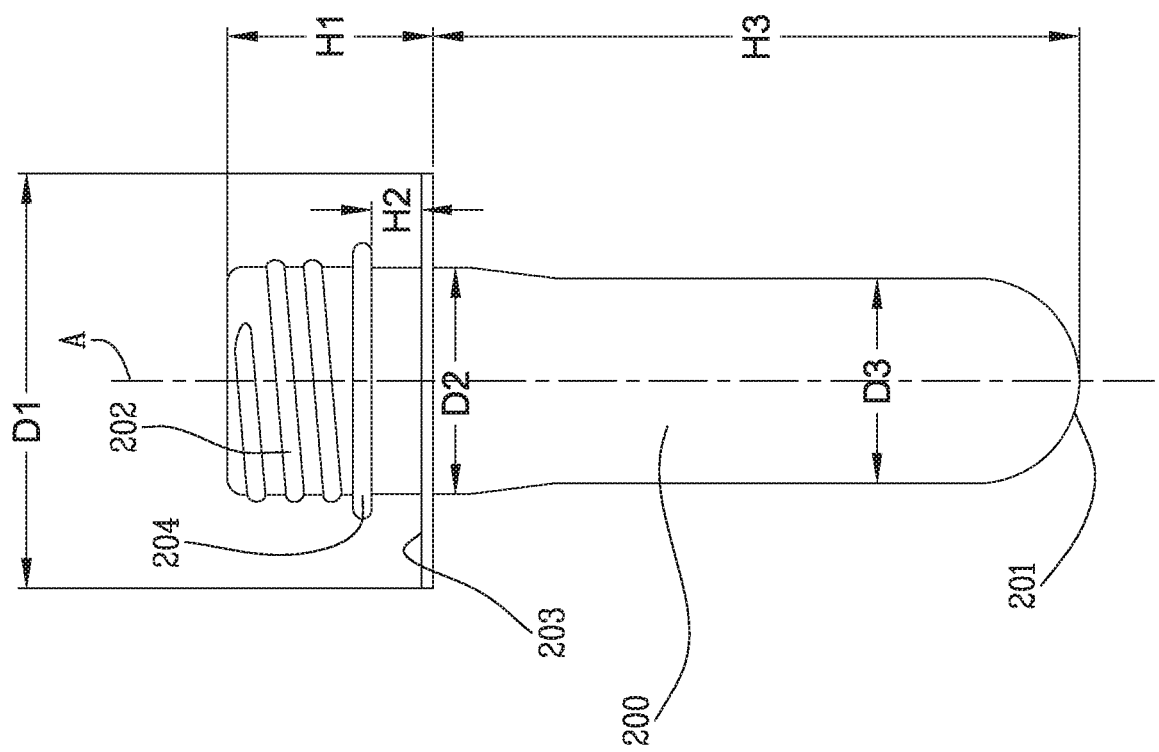
FIG. 11 illustrates a parison.

With reference to the accompanying drawings, the numeral 1 denotes an apparatus for optical inspection of parisons 2.

Each parison 2 includes a body 200 that is substantially cylindrical in shape. The parison 2 (that is, the body 200) defines an axis of symmetry A. The body 200 is thus cylindrically symmetric about the axis of symmetry A. The parison 2 includes a closed bottom 201. The parison 2 includes a thread (or neck) 202 defining an opening. The parison 2 includes a flange 203, projecting from the body 200 and interposed between the body 200 and the thread 202.

The flange 203 has a diameter D1. The body 200 has a diameter D3. The under-flange zone (connecting portion between body and flange) has a diameter D2.

The diameter D1 of the flange 203 is greater than the diameter D2 of the under-flange zone; the diameter D1 of the flange 203 is also greater than the diameter D3 of the body 200. The thread 202 extends between the flange 203 and the opening; the thread 202 defines a height H1 of the thread 202. The body 200 defines a height H3 of the body. The parison 2 may also include a seal breaking ring 204, positioned on the thread 202 and having a height H2 relative to the flange 203.

The apparatus 1 comprises a conveyor 3. The conveyor 3 is configured to transport the parisons 2 in succession along an inspection path.

In an embodiment, a feeder 11 is provided for feeding the parisons 2 to the inspection path. The feeder 11 may be part of the apparatus 1 or it may be an external accessory. In an embodiment, the feeder 11 comprises a pair of rollers. In an embodiment, the feeder 11 is a centrifugal feeder.

In an embodiment, the apparatus 1 comprises a buffer 12. The feeder 11 is configured to feed the parisons 2 in succession to the buffer 12. The buffer 12 is configured to receive and retain the parisons 2 for a predetermined length of time.

The conveyor 3 comprises a pair of lateral, under-flange guides 31A. The lateral, under-flange guides 31A are configured to hold each parison 2 up by its flange 203. The distance between the lateral guides 31 of the pair is greater than the under-flange diameter D2 of the parisons 2 and less than the diameter D1 of the flange 203 of the parisons 2.

The conveyor 3 may comprise a pair of body guides 31B. The body guides 31B are configured to stabilize the parisons 2, which the under-flange guides 31A hold up by the flange.

The under-flange guides 31A and the body guides 31B are parallel to each other. The under-flange guides 31A and the body guides 31B preferably extend in a horizontal direction, perpendicular to the weight force.

The under-flange guides 31A include a first portion which extends through (and defines) the buffer 12. The body guides 31B are defined entirely in the buffer 12.

The conveyor 3 comprises a feed channel 34. The feed channel 34 is configured to convey an air jet which pushes the parisons, supported by the under-flange guides 31A, in a feed direction (defined from the feeder 11 towards the first inspection segment 4). The feed channel 34 runs parallel to the under-flange guides 31A.

Thus, along the buffer 12, the parisons 2 are supported by the first portion of the under-flange guides 31A, are stabilized by the body guides 31B and are pushed forward by the air jet conveyed into the feed channel 34.

The apparatus 1 comprises a spacer 13. The spacer 13 is configured to receive the parisons 2 from the buffer 12.

In an embodiment, the spacer 13 comprises a pair of wheels configured to receive the parisons 2 one by one and to release them after a predetermined length of time, thereby spacing them. The wheels of the spacer 13 are configured to hold the parisons 2 by the thread 203.

The apparatus 1 comprises a first inspection segment 4; The first inspection segment 4 defines a first portion of the inspection path.

The apparatus 1 comprises a second inspection segment 5; The second inspection segment 5 defines a second portion of the inspection path.

The spacer 13 is configured to space the parisons 2 and to feed them in succession to the first inspection segment 4.

The under-flange guides 31A include a second portion which extends through the first inspection segment 4.

The conveyor 3 includes a pair of feed belts 402. The feed belts 402 run parallel to the second portion of the under-flange guides 31A. The feed belts 402 are configured to advance the parisons 2, supported by the second portion of the under-flange guides 31A, along the first inspection segment 4. The feed belts 402 are configured to contact the body 200 of each parison on opposite sides of it. The feed belts 402 are driven by two respective electric motors (brushless, for example) which are synchronized with each other.

The apparatus 1 includes, at the entrance to the first inspection segment 4, a presence sensor (for example, a photocell connected to an encoder, configured to trace the position of the parison in space), configured to detect the entry of each parison 2 into the first inspection segment 4. The control unit is configured to control the cameras of the first inspection segment 4 as a function of the signals it receives from the presence sensor so that they take snapshots the moment the parison enters the respective inspection station.

The apparatus 1 comprises a first inspection station 41 of the first inspection segment 4. The first station 41 is positioned along the first inspection segment 4. The first inspection station 41 is configured to receive a parison 2 to be inspected.

The first inspection station 41 includes a first camera 410. The first inspection station 41 includes a second camera 411. The first camera 410 and the second camera 411 are disposed on a first side of the inspection path, on the outside of the under-flange guides 31A. The first inspection station 41 includes a third camera 412. The first inspection station 41 includes a fourth camera 413. The third camera 412 and the fourth camera 413 are disposed on a second side of the inspection path (opposite to the first side), on the outside of the under-flange guides 31A. Preferably, the first camera 410, the second camera 411, the third camera 412 and the fourth camera 413 are angularly equispaced from each other (at 45° from one another).

In an embodiment, the first inspection station 41 also includes a first beam splitter mirror 410A, a second beam splitter mirror 411A, a third beam splitter mirror 413A and a fourth beam splitter mirror 414A.

In an embodiment, the first camera 410, the second camera 411, the third camera 412 and the fourth camera 413 are directed at the first beam splitter mirror 410A, the second beam splitter mirror 411A, the third beam splitter mirror 413A and the fourth beam splitter mirror 414A, respectively; through the respective beam splitter mirrors, the cameras see the parison 2 located in the first inspection station 41. For example, the first camera 410, the second camera 411, the third camera 412 and the fourth camera 413 may be located above the respective beam splitter mirrors and face downwards in order to see the parison 2 (specifically the thread).

The first, second, third and fourth cameras 410, 411, 412 and 413 see the thread of the parison 2 according to viewing axes which are offset by an angle between 40° and 50° (preferably) 45° through the first, second, third and fourth beam splitter mirrors 410A, 411A, 412A e 413A, respectively.

In an embodiment, the first inspection station 41 also includes a first backlight illuminator 410B, a second backlight illuminator 411B, a third backlight illuminator 412B and a fourth backlight illuminator 413B. The first backlight illuminator 410B is disposed in front of the first beam splitter mirror 410A (on the side opposite to the parison 2 in the first inspection station 41). The first backlight illuminator 410B may be associated with the fourth beam splitter mirror 413A. The second backlight illuminator 411B is disposed in front of the second beam splitter mirror 411A (on the side opposite to the parison 2 in the first inspection station 41). The second backlight illuminator 411B may be associated with the third beam splitter mirror 412A. The third backlight illuminator 412B is disposed in front of the third beam splitter mirror 412A. The third backlight illuminator 412B may be associated with the second beam splitter mirror 411A. The fourth backlight illuminator 413B is disposed in front of the fourth beam splitter mirror 413A. The fourth backlight illuminator 413B may be associated with the first beam splitter mirror 410A. The control unit is configured to control the first camera 410, the second camera 411, the third camera 412 and the fourth camera 413 in such a way as to offset (by a few milliseconds) the instants in which they take the snapshots. More specifically, the first and second cameras 410, 411 take the snapshots at a first instant and the third and fourth cameras 412, 413 take the snapshots at a second instant, after the first instant. That avoids interference between the front cameras.

Alternatively (or in addition) to the temporal offset between the instants the cameras take the snapshots, the positions of the cameras can be angularly offset in such a way that they are not in front of one another and thus do not interfere with one another.

In the first inspection station 41, the thread 202 of the parison 2 is inspected; the number printed on the parison, indicating the number of the mould cavity in which the parison was moulded, is preferably also detected in the first station 41.

The apparatus 1 comprises a second inspection station 42 of the first inspection segment 4.

The second inspection station 42 is positioned along the first inspection segment 4. The second inspection station 42 is configured to receive a parison 2 to be inspected. In an embodiment, the second inspection station 42 is located downstream of the first inspection station 41 along the inspection path.

In the second inspection station 42, the bottom 201 of the parison 2 is inspected. The second inspection station 42 includes a camera 421 located above the parison 2 in transit in the second inspection station 42. The focus of the camera 421 is on the bottom 201 of the parison 2. The second inspection station 42 includes a backlight illuminator 422 located under the parison 2 in transit in the second inspection station 42. The camera 421 and the backlight illuminator 422 are movable along the vertical direction. Preferably, the camera 421 and the backlight illuminator 422 are mounted on a carriage 423 to move (as one) along the vertical direction. The conveyor 3 includes an adjustment actuator, configured to move the carriage 423 as a function of the size of the parisons to be inspected (specifically as a function of the height H3 of the body 200).

The apparatus 1 comprises a third inspection station 43 of the first inspection segment 4.

The third inspection station 43 is positioned along the first inspection segment 4. The third inspection station 43 is configured to receive a parison 2 to be inspected. In an embodiment, the third inspection station 43 is located downstream of the second inspection station 42 along the inspection path.

In the third inspection station 43, the upper edge of the parison 2 (defining the opening) is inspected. The third inspection station 43 includes a camera 431 located above the parison 2 in transit in the second inspection station 42 (to see the upper edge of the parison 2 from above). The focus of the camera 431 is on the upper edge of the parison 2.

The third inspection station 43 includes a ring illuminator 432 located above the parison 2 in transit in the third inspection station 3 The ring illuminator 432 defines a central hole through which the camera 431 sees the parison 2. The third inspection station 43 may also include a dark (preferably black) background element 433. The background element 433 is located under the parison 2, at a position opposite the camera 431. The background element 433 minimizes (cancels) glare. The background element 433 (if present) is movable along the vertical direction by means of a respective actuator in order to adapt to the size of the parisons.

The camera 431 thus sees a white circle (defined by the upper edge of the parison 2, which reflects the light in the direction it comes from); if the edge is flawed, the camera 431 sees a dark zone on the white circle because the flaw reflects the light in other directions.

The apparatus 1 includes a second inspection segment 5;

In an embodiment, the apparatus 1 comprises a first rejection device 14. The first rejection device 14 is configured to isolate the parisons 2 identified as defective in the first inspection segment 4 and to feed them to a first rejection container 16. The first rejection device 14 is interposed between the first inspection segment 4 and the second inspection segment 5. The good parisons, on the other hand, are fed to the second inspection segment 5.

The apparatus 1 includes, at the entrance to the second inspection segment 5, an additional presence sensor (a photocell connected to an encoder, configured to trace the position of the parison in space), configured to detect the entry of each parison 2 into the second inspection segment 5. The control unit is configured to control the cameras of the second inspection segment 5 as a function of the signals it receives from the additional presence sensor so that they take snapshots the moment the parison enters the respective inspection station.

The conveyor 3 includes a suction (or vacuum) belt 50. The suction belt 50 has a plurality of holes. The suction belt 50 is configured to contact the upper edge of the parisons 2 and to create a negative pressure (or vacuum) inside each parison 2. Preferably, each parison 2 is always in communication with at least two holes to create the negative pressure inside the parison.

The suction belt 50 is configured to hold the parisons 2 by this negative pressure. The suction belt 50 is configured to advance along the inspection path, transporting the parisons 2 along with it. The suction belt 50 is configured to feed the parisons 2 along the second inspection segment 5. In the second inspection segment 5, the suction belt 50 surmounts the parisons 2. Between the first inspection segment 4 and the second 5, there is a transient in which the parisons 2 are not only supported by the guides 31A but are also surmounted by the suction belt 50; after that, the guides 31A stop and the parisons 2 are supported and transported only by the suction belt 50.

Preferably, the suction belt 50 is adjustable in height. The apparatus includes an actuator configured to adjust the height of the suction belt 50 (along the vertical direction) as a function of the height H1 of the thread 202 of the parisons 2.

The first rejection device 14 comprises an electrovalve configured to emit a (compressed) air jet through a blower located inside the suction belt 50; when defective parisons are detected in the first inspection segment 4, the electrovalve activates the air jet, thereby causing the defective parisons to drop from the suction belt 50.

The apparatus 1 comprises a first inspection station 51 of the second inspection segment 5.

The first inspection station 51 is positioned along the second inspection segment 5. The first inspection station 51 includes a first camera 510. The first inspection station 51 includes a second camera 511. The first camera 510 and the second camera 511 are disposed on the second (or first) side of the inspection path. The first camera 510 and the second camera 511 are configured to see the parison 2 positioned in the first inspection station 51. In an embodiment, the first inspection station 51 also includes a first mirror 510A, and a second mirror 511A. The first and second cameras 510, 511 see the parison (specifically the body 200) through the first mirror 510A and the second mirror 511A. In an embodiment, the first and second cameras 510, 511 are positioned under the respective first mirror 510A and second mirror 511A and are directed upwards.

Through the first mirror 510A and the second mirror 511A, respectively, the first camera 510 and the second camera 511 see the parison located in the first inspection station 51 of the second segment 5 according to incident viewing axes defining between them an angle of between 60° and 120° (preferably between 80° and 110° and, still more preferably, 90°). The first camera 510 and the second camera 511 have slightly offset positions (that is to say, they see the parison 2 inside the first inspection station 51 at different positions) so as to minimize (avoid) interference.

The first inspection station 51 includes a first illuminator 512. The first inspection station 51 includes a second illuminator 513. In an embodiment, the first illuminator 512 and the second illuminator 513 each include a respective polarizer filter to illuminate the parison 2 with polarized light. In particular, the first illuminator 512 includes a first light source and a first emission polarizer filter; the second illuminator 513 includes a second light source and a second emission polarizer filter. The first emission polarizer filter is interposed between the first light source and the parison 2 positioned at the first inspection station 51. The second emission polarizer filter is interposed between the second light source and the parison 2 positioned at the first inspection station 51.

In another embodiment, the first illuminator 512 and the second illuminator 513 each include a respective grid (printed on the illuminator).

The first illuminator 512 and the second illuminator 513 are disposed on the first (or second) side of the inspection path, so as to illuminate the parison 2 located in the first inspection station 51 from the back relative to the first camera 510 and the second camera 511. In particular, the first illuminator 512 illuminates the parison 2 from the back relative to the second camera 511 (in fact, the parison 2 is interposed between the first illuminator 512 and the second camera 511). The second illuminator 513 illuminates the parison 2 from the back relative to the first camera 510 (in fact, the parison 2 is interposed between the second illuminator 513 and the first camera 510).

In an embodiment, the first inspection station 51 includes a first receiving polarizer filter; the first receiving polarizer filter is interposed between the first camera 510 and the parison 2 positioned at the inspection station 51. The first inspection station 51 further includes a second receiving polarizer filter; the second receiving polarizer filter is interposed between the second camera 511 and the parison 2 positioned at the inspection station 51.

In this embodiment, the first inspection station 51 may include (or define) a device for optical inspection of the type disclosed in the patent application PCT/IB2019/060699 in the name of the same Applicant. It is explicitly intended that all the features of the device of the patent application PCT/IB2019/060699 may be applied to the first inspection station 51 according to this embodiment.

In particular, in an embodiment, the first emission polarizer filter of the first illuminator 512 is a linear filter and the second receiving polarizer filter of the second camera 511 is also a linear filter; the first emission polarizer filter of the first illuminator 512 is oriented at 45° relative to the second receiving polarizer filter of the second camera 511; preferably, the parison 2 is oriented with its axis of symmetry A parallel to the polarizing direction of the first emission polarizing filter or of the second receiving polarizer filter. Analogously, the second emission polarizer filter of the second illuminator 513 is a linear filter and the first receiving polarizer filter of the first camera 510 is also a linear filter; the second emission polarizer filter of the second illuminator 513 is oriented at 45° relative to the first receiving polarizer filter of the first camera 510; preferably, the parison 2 is oriented with its axis parallel to the polarizing direction of the parison 2 is oriented with its axis of symmetry A parallel to the polarizing direction of the first receiving polarizer filter.

In another embodiment, the first emission polarizer filter of the first illuminator 512 is a circular filter and the second receiving polarizer filter of the second camera 511 includes a plurality of linear filter portions, having respective polarizing directions different to each other (for example, having four linear filter portions oriented at 45° relative to each other); through an algorithm, it is possible to select which filter portion to use, depending on the size of the parison and/or its position. Analogously, the second emission polarizer filter of the second illuminator 513 is a circular filter and the first receiving polarizer filter of the first camera 510 includes a plurality of linear filer portions, having respective polarizing directions different to each other (for example, having four linear filter portions oriented at 45° relative to each other); through an algorithm, it is possible to select which filter portion to use, depending on the size of the parison and/or its position.

The first inspection station 51 is configured to identify stress and deformation in the body 200 of the parisons 2.

The apparatus 1 comprises a second inspection station 52 of the second inspection segment 5. The second inspection station 52 is positioned along the second inspection segment 5.

The second inspection station 52 of the second inspection segment 5 includes a first camera 520. The second inspection station 52 includes a second camera 521. The second inspection station 52 includes a third camera 522. The first camera 520, the second camera 521 and the third camera 522 are disposed on the second (or first) side of the inspection path. In an embodiment, the second inspection station 51 also includes a first mirror 520A, a second mirror 521A and a third mirror 522A. The first, second and third cameras 520, 521, 522 see the parison 2 (specifically the body 200) through the first mirror 520A, the second mirror 521A and the third mirror 522A. In an embodiment, the first, second and third cameras 520, 521, 522 are positioned under the respective first mirror 520A, second mirror 521A and third mirror 522A and are directed upwards.

Through the respective first mirror 520A, second mirror 521A and third mirror 522A, the first camera 520, second camera 521 and third camera 522 are directed towards the parison 2 positioned in the fourth inspection station 52. The first camera 520, the second camera 521 and the third camera 522 have viewing axes which (through the mirrors) are incident and make angles between 40° and 45° between them.

The second inspection station 52 is configured to identify irregularities and defects in the body 200 of the parisons 2, such as, for example, blackspots, blisters and colour defects.

In an embodiment, the apparatus 1 comprises a second rejection device 15. The second rejection device 15 is configured to isolate the parisons 2 identified as defective in the second inspection segment 5 and to feed them to a second rejection container 17.

The second rejection device 15 is also configured to feed the remaining parisons 2, which are not defective (that is, good), to a container 18 (or directly to the blow-moulding machine or other machine on the line).

The second rejection device 15 comprises an (additional) electrovalve configured to emit a (compressed) air jet through a blower located inside the suction belt 50; when defective parisons are detected in the second inspection segment 5, the (additional) electrovalve activates the blower, thereby causing the defective parisons to drop from the suction belt 50.

In the first and/or the second inspection segment 4, 5, the apparatus 1 may also comprise a bottom-up camera (positioned under the parison to be inspected), a respective bottom-up illuminator and a pair of Fresnel lenses interposed between the bottom-up camera and the parison to inspect both the bottom and the side wall of the parison from the outside (this solution is useful, for example, in the case of coloured parisons, which cannot be inspected by transparency). In an embodiment, the Fresnel lenses are movable between a disabled position and an enabled position, where they intercept the light beam emitted by the illuminator (they are set at the enabled position to inspect coloured parisons and at the disabled position to inspect transparent parisons).

In an embodiment, the apparatus 1 also comprises a parison recognition station. The recognition station is preferably located outside the inspection path. The recognition station comprises a recognition camera 7 configured to capture an image of a parison 20 positioned in the recognition station. The recognition station may also include a respective illuminator 701 configured to illuminate the parison 20 (preferably from the back).

The conveyor 3 has a plurality of operating configurations. The operating configurations of the conveyor 3 are defined by respective positions of one or more of the following elements (or components) making up the conveyor 3: the under-flange guides 31A, the body guides 31B, the feed channel 50, the feed belts 402 and the suction belt 50.

More specifically, the under-flange guides 31A are movable towards and away from each other to vary the distance between them. The distance between the under-flange guides 31A is set as a function of the diameter D1 of the flange 203 and/or of the under-flange diameter D2 of the parisons 2.

The body guides 31B are movable towards and away from each other to vary the distance between them. The distance between the body guides 31B is set as a function of the diameter D3 of the body 200 of the parisons 2.

The feed channel 34 might also be movable (that is, adjustable) along the vertical direction, to vary the height of the channel relative to the under-flange guides 31A. The height of the feed channel 34 relative to the under-flange guides 31A is set on the basis of the height H1 of the thread 202.

The feed belts 402 might also be adjustable towards and away from each other. The distance between the feed belts 402 is set as a function of the diameter D3 of the body 200 of the parisons 2.

The suction belt 50 is adjustable in height (to vary its vertical level above the floor. The height of the suction belt 50 is adjusted as a function of the height H1 of the thread 202. More specifically, the control unit adjusts the height of the suction belt in such a way that the flange 203 is at a predetermined (constant) level.

The camera 421 of the second inspection station 42 of the first inspection segment 4 is adjustable in height as one with the illuminator 422 (by means of the carriage 423) as a function of the height H3 of the body 200 and of the height H1 of the thread 202 of the parison 2.

The wheels of the spacer 13 are adjustable towards and away from each other as a function of the diameter D1 of the flange 203 and/or of the under-flange diameter D2 of the parisons 2.

In an embodiment, the apparatus 1 comprises an adjustment actuator 6 configured to move the under-flange guides 31A towards and away from each other. In an embodiment, the apparatus 1 comprises an adjustment actuator 6 configured to move the body guides 31B towards and away from each other. In an embodiment, the apparatus 1 comprises an adjustment actuator 6 configured to move the feed channel 34 (along the vertical direction). In an embodiment, the apparatus 1 comprises an adjustment actuator 6 configured to move the feed belts 402 towards and away from each other. In an embodiment, the apparatus 1 comprises an adjustment actuator 6 configured to move the camera 421 of the second inspection station 42 along the vertical direction. In an embodiment, the apparatus 1 comprises an adjustment actuator 6 configured to move the wheels of the spacer 13 towards and away from each other. In an embodiment, the apparatus 1 comprises an adjustment actuator 6 configured to move the suction belt 50 (along the vertical direction).

The operating position of the conveyor 3 is defined by the operating position of the under-flange guides 31A, of the body guides 31B, of the wheels of the spacer 13, of the camera 421 of the second inspection station 42, of the suction belt 50, of the feed belts 402 and/or of the feed channel 34. In an embodiment, the apparatus 1 comprises an adjustment actuator 6 configured to change the operating configuration of the conveyor 3. Preferably, the apparatus 1 comprises a plurality of adjustment actuators 6 configured to change the operating configuration of the conveyor 3.

In an embodiment, at least one camera of the first inspection station 41, second inspection station 42, third inspection station 43 of the first inspection segment 4 and/or of the first inspection station 51 or second inspection station 52 of the second inspection segment 5 is movable relative to the conveyor 3. More specifically, one or more of the following cameras may be movable: first camera 410 of the first inspection station 41 of the first inspection segment 4, second camera 411 of the first inspection station 41, third camera 412 of the first inspection station 41, fourth camera 413 of the first inspection station 41, camera 421 of the second inspection station 42, camera 431 of the third inspection station, first camera 510 of the first inspection station 51 of the second inspection segment 5, second camera 511 of the first inspection station 51 of the second inspection segment 5, first camera 520 of the second inspection station 52, second camera 521 of the second inspection station 52, third camera 522 of the second inspection station 52. These cameras may be movable towards or away from the inspection path (hence towards or away from the parisons 2).

In an embodiment, at least one illuminator of the first inspection station 41, second inspection station 42, third inspection station 43 of the first inspection segment 4 and/or of the first inspection station 51 or second inspection station 52 of the second inspection segment 5 is movable relative to the conveyor 3.

In an embodiment, at least one mirror of the first inspection station 41, second inspection station 42, third inspection station 43 of the first inspection segment 4 and/or of the first inspection station 51 or second inspection station 52 of the second inspection segment 5 is movable relative to the conveyor 3.

In an embodiment, the apparatus 1 (that is, the adjustment system) includes at least one additional adjustment actuator 61 configured to move at least one respective camera relative to the conveyor 3 and/or to move at least one respective illuminator relative to the conveyor 3 and/or to set it to a plurality of configurations.

Thus, at least one additional adjustment actuator 61 is configured to change the operating configuration of at least one inspection station 41, 42, 43, 51, 52. Preferably, the apparatus 1 includes a plurality of adjustment actuators 61 configured to change the operating configuration of the inspection stations 41, 42, 43, 51, 52.

The operating position of each inspection station 41, 42, 43, 51, 52 is defined by the operating position of the respective cameras and of the respective illuminators.

The apparatus 1 comprises a control unit 5. The control unit 5 is configured to control the at least one adjustment actuator 6 (or the plurality of adjustment actuators 6) of the conveyor 3. The control unit 5 is configured to control the at least one additional adjustment actuator 61 (or the plurality of additional adjustment actuators 61) of the inspection stations 41, 42, 43, 51, 52. In an embodiment, the control unit 5 controls both the at least one adjustment actuator 6 (or the plurality of adjustment actuators 6) of the conveyor 3, and the at least one additional adjustment actuator 61 (or the plurality of additional adjustment actuators 61) of the inspection stations 41, 42, 43, 51, 52.

In an embodiment, the control unit 5 is configured to receive input data 81 representing a size of the parisons 2 to be inspected. The input data 81 include one or more of the features in the following list: diameter D1 of the flange 203; under-flange diameter D2; height H1 of the thread 202; diameter D3 of the body 200; height of the parison body height of the seal breaking ring colour; material the parison is made of.

In an embodiment, as already mentioned, the apparatus 1 comprises a recognition camera 7 configured to capture an image of one of the parisons 2 to be inspected. The control unit 5 is configured to process the image captured by the recognition camera 7 to derive the input data 81 (specifically to derive the dimensions of the parison).

The control unit 5 is configured to generate, as a function of the input data 81, a setting dataset 82 defining a corresponding operating configuration of the conveyor 3 and/or of at least one inspection station 41, 42, 43, 51, 52.

In an embodiment, the control unit 5 is configured to query a database 91 to retrieve the setting dataset 82 as a function of the input data 81.

In an embodiment, the control unit 5 is configured to query the database 91 and, if a setting dataset 82 corresponding to the input data 81 is not already stored in the memory, to derive them and, optionally, to store them in the database 91 for subsequent adjustments.

In an embodiment, the control unit 5 is configured to generate an adjustment signal 83 as a function of the setting dataset 82 in order to control the movement of the at least one adjustment actuator 6 of the conveyor 3.

In an embodiment, the control unit 5 is configured to generate an additional adjustment signal 84 as a function of the setting dataset 82 in order to control the movement of the at least one additional adjustment actuator 61 of the at least one inspection station 41, 42, 43, 51, 52.

In an embodiment, the control unit 5 is configured to generate a feedback correction signal as a function of the images captured by the cameras. The feedback correction signal is sent to the at least one additional adjustment actuator 61.

The inspection cameras 410, 411, 412, 413, 421, 431, 510, 511, 520, 521, 522 are configured to capture image data 85 of a parison 2 positioned in the inspection stations 41, 42, 43, 51, 52.

In an embodiment, at least one inspection camera 410, 411, 412, 413, 421, 431, 510, 511, 520, 521, 522 is configured to send the image data 85 to the control unit 5. The control unit 5 is configured to compare the image data 85 with reference data relating to a reference position of the parisons 2 relative to the conveyor 3, in order to derive a correction signal in response to the comparison between the image data 85 and the reference data (in an embodiment, retrieved from the database 91).

This disclosure also relates to a line 100 for making containers of thermoplastic material—for example, bottles.

The line 100 comprises a moulding machine 101 configured to make (that is, to mould) parisons 2. In an embodiment, the moulding machine 101 is a rotary machine. The line 100 also comprises a heating oven 102 configured to receive the moulded parisons 2 and to heat them. The line 100 comprises a blow-moulding machine 103 configured to blow-mould the parisons 2 so as to make the containers. In an embodiment, the blow-moulding machine 103 is a rotary machine.

Preferably, the line 100 includes a first transfer carousel 106 configured to transfer the parisons 2 from the moulding machine 101 to the heating oven 102. Preferably, the line 100 includes a second transfer carousel 107 configured to transfer the parisons 2 from the heating oven 102 to the blow-moulding machine 103. In an embodiment, the line 100 includes a storage unit 104 for storing the moulded parisons 2 before they are blow-moulded. In an embodiment, the line 100 includes a parison orienting device 105 configured to orient the parisons 2 leaving and/or entering the storage unit 104. In an embodiment, the line 100 includes a conveyor 108 configured to convey the parisons 2 into and/or out of the storage unit 104. The conveyor 108 feeds the parisons 2 from the storage unit 104 to the heating oven 102.

In an embodiment, the apparatus 1 is integrated in the line 100, preferably downstream of the moulding machine 101 and upstream of the blow-moulding machine 103. In an embodiment, the apparatus 1 is integrated in the line 100 along the conveyor 108.

In an embodiment, the apparatus 1 is outside of the line.

The following paragraphs, listed in alphanumeric order for reference, are non-limiting example modes of describing this invention.

A. An apparatus for optical inspection of parisons made of thermoplastic material, comprising:
- a conveyor, configured to transport the parisons in succession along an inspection path;
- an inspection station, located along the inspection path and including at least one inspection camera, configured to capture image data of a parison positioned in the inspection station, wherein the apparatus has a first operating configuration for inspecting parisons of a first size and a second operating configuration for inspecting parisons of a second size, different from the first size, the apparatus comprising an adjustment system, configured to change the apparatus between the first and the second operating configuration.

A0. The apparatus according to paragraph A, comprising a plurality of inspection stations disposed along the inspection path, wherein each inspection station of the plurality of inspection stations includes at least one inspection camera, configured to capture image data of a parison positioned in the inspection station.

A1. The apparatus according to paragraph A or paragraph A0, comprising a control unit.

A1.1. The apparatus according to paragraph A1, wherein the control unit is configured to control the adjustment system.

A1.2. The apparatus according to paragraph A1 or paragraph A.1.1,
wherein the control unit is configured to
receive input data representing a size of the parisons to be inspected; process the input data to derive, as a function of the size of the parisons to be inspected, a setting dataset defining a corresponding operating configuration of the apparatus.

A1.2.1. The apparatus according to paragraph A1.2, wherein the control unit is programmed to generate an adjustment signal as a function of the setting dataset in order to control the movement of the adjustment system.

A1.2.2. The apparatus according to paragraph A1.2 or paragraph A1.2.1, comprising an interface configured to make the setting dataset available.

A1.2.3. The apparatus according to any one of paragraphs A1.2 to A1.2.2, comprising a recognition camera configured to capture an image of one of the parisons to be inspected, wherein the control unit is configured to process the image captured by the recognition camera to derive the input data.

A1.2.4. The apparatus according to any one of paragraphs A1.2 to A1.2.3, wherein the control unit is configured to store the setting dataset in a database, wherein the setting dataset is correlated with the parison size.

A1.2.5. The apparatus according to any one of paragraphs A1.2 to A1.2.3, wherein the control unit has access to a memory containing a plurality of setting datasets, representing a corresponding plurality of operating configurations of the apparatus, each of which corresponds to a respective parison size.

A1.2.5.1. The apparatus according to paragraph A1.2.5, wherein the control unit is configured to query the memory as a function of the input data to select a setting dataset from the plurality (defining an operating configuration of the apparatus, corresponding to the size of the parisons to be inspected).

A1.2.6. The apparatus according to any one of paragraphs A1.2 to A1.2.5.1, wherein the input data include one or more of the features in the following list:
- diameter of the flange of the parison;
- height of the thread of the parison;
- diameter of the under-flange zone of the parison;
- diameter of the body of the parison;
- height of the body of the parison;
- height of the seal breaking ring of the parison;
- colour of the parison;
- material the parison is made of.

A1.3. The apparatus according to any one of paragraphs A1 to A1.2.6, wherein the control unit is configured to compare the image data with reference data relating to a reference position of the parisons relative to the conveyor, in order to derive a correction signal in response to the comparison between the image data and the reference data.

A1.3.1. The apparatus according to paragraph A1.3, wherein one or more of the following options is true:
- the correction signal is configured to drive the at least one adjustment actuator;
- the correction signal represents a setting of the inspection station;
- the correction signal represents an updated version of the image data, the control unit being programmed to replace the image data captured by the at least one inspection camera with the updated version.

A2. The apparatus according to any one of paragraphs A to A1.3.1, wherein the conveyor has a first operating configuration, corresponding to the first operating configuration of the apparatus to transport parisons of the first size, and a second operating configuration, corresponding to the second operating configuration of the apparatus, to transport the parisons of the second size, wherein the adjustment system includes at least one adjustment actuator, configured to move the conveyor between the first and the second operating configuration.

A3. The apparatus according to any one of paragraphs A to A2, wherein the inspection station has a first operating configuration, corresponding to the first operating configuration of the apparatus to see parisons of the first size, and a second operating configuration, corresponding to the second operating configuration of the apparatus, to see the parisons of the second size.

A3.1. The apparatus according to paragraph A3, wherein the adjustment system includes at least one (additional) adjustment actuator, configured to automatically change the operating configuration of the inspection station.

A3.2. The apparatus according to paragraph A3 or paragraph A3.1, wherein the plurality of operating configurations of the inspection station includes a first operating configuration, where the at least one inspection camera is at a first position, and a second operating configuration, where the at least one inspection camera is at a second position, different from the first position.

A4. The apparatus according to any one of paragraphs A to A3.2, wherein the apparatus includes a plurality of adjustment actuators, each adjustment actuator of the plurality being configured to change an operating configuration of the conveyor or of the inspection station, wherein the apparatus comprises a control unit, configured to synchronously control the plurality of adjustment actuators.

A5. The apparatus according to any one of paragraphs A to A4, wherein each parison includes a body, a thread and a flange, wherein the thread defines an open annular end, the body extends between the thread and a closed bottom, defining an internal cavity, and the flange projects radially from the body, wherein the conveyor includes one or more of the elements listed below:
- a pair of under-flange guides configured to support the parisons by holding them up by the flange, wherein the guides of the pair are movable towards and away from each other to vary the distance between them;
- a pair of body guides configured to contact an outside wall of the parison body, wherein the body guides of the pair are movable towards and away from each other to vary the distance between them;
- a feed channel, above the under-flange guides, configured to convey a jet of air to cause the parisons to advance along the guides of the pair, wherein the feed channel is movable along a vertical direction, at right angles to the pair of guides, towards and away from the pair of guides;
- a pair of feed belts, configured to contact the outside of the parison body to cause the parisons to advance along the guides of the pair, wherein the feed belts of the pair are movable towards and away from each other to vary the distance between them;
- a suction belt, configured to advance along a feed direction and to contact the open annular end of the parisons and to create a negative pressure in the internal cavity of the parisons, so as to support and move them in the feed direction, wherein the suction belt is movable along the vertical direction.

A5.1. The apparatus according to paragraph A5, wherein the adjustment system is configured to move at least one of the elements of the conveyor to define the first and the second operating configuration.

B1. A line for making containers from thermoplastic material, comprising a moulding machine, configured to make parisons, and an apparatus for optical inspection of the parisons according to any one of paragraphs A to A5.1, wherein the optical inspection device is operatively located downstream of the moulding machine.

B1.1. The line according to paragraph B1, comprising a blow-moulding machine configured to receive the parisons and to blow-mould them in moulds to make the containers, wherein the optical inspection device is operatively located upstream of the blow-moulding machine.

B2. A line for making containers from thermoplastic material, comprising a blow-moulding machine, configured to receive the parisons and to blow-mould them in moulds to make the containers, and a device for optical inspection of the parisons according to any one of paragraphs A to A5.1, wherein the optical inspection device is operatively located upstream of the blow-moulding machine.

B2.1. The line according to paragraph B2, comprising a moulding machine, configured to make parisons, wherein the optical inspection device is operatively located downstream of the moulding machine.

C. A method for optical inspection of parisons, comprising the following steps:
- conveying the parisons to be inspected in succession along an inspection path, by means of a conveyor;
- capturing image data of a parison positioned in an inspection station by means of at least one inspection camera;
- moving an apparatus for optical inspection of parisons, by means of an adjustment system, between a first operating configuration, for inspecting parisons of a first size, and a second operating configuration, for inspecting parisons of a second size, different from the first size.

C1.1. The method according to paragraph C, wherein the adjustment system is controlled by a control unit.

C1.2. The method according to paragraph C or paragraph C1.1, wherein the step of moving the apparatus comprises the following sub-steps:
- receiving input data representing a size of the parisons to be inspected;
- processing the input data and deriving, as a function of the size of the parisons to be inspected, a setting dataset defining a corresponding operating configuration of the apparatus.

C1.2.1. The method according to paragraph C1.2, wherein the step of moving the apparatus comprises the following sub-step:
  generating an adjustment signal as a function of the setting dataset in order to control the movement of the adjustment system.

C1.2.2. The method according to paragraph C1.2 or paragraph C1.2.1, comprising a sub-step of making the setting dataset available to a user.

C1.2.3. The method according to any one of paragraphs C1.2 to C1.2.2, wherein the step of moving the apparatus comprises the following sub-steps:
  capturing an image of one of the parisons to be inspected by means of a recognition camera;
  deriving input data, representing a size of the parisons to be inspected, as a function of the image captured by the recognition camera.

C1.2.4. The method according to any one of paragraphs C1.2 to C1.2.3, comprising a step of storing the setting dataset in a database, wherein the setting dataset is correlated with the parison size.

C1.2.5. The method according to any one of paragraphs C1.2 to C1.2.4, comprising a step of querying a memory as a function of the input data, the memory containing a plurality of setting datasets, representing a corresponding plurality of operating configurations of the apparatus, each of which corresponds to a respective parison size, in order to select a setting dataset from the plurality (defining an operating configuration of the apparatus, corresponding to the size of the parisons to be inspected).

C1.2.6. The method according to any one of paragraphs C1.2 to C1.2.5, wherein the input data include one or more of the features in the following list:
  diameter of the flange of the parison;
  height of the thread of the parison;
  diameter of the under-flange zone of the parison;
  diameter of the body of the parison;
  height of the body of the parison;
  height of the seal breaking ring of the parison;
  colour of the parison;
  material the parison is made of.

C1.3. The method according to any one of paragraphs C to C1.2.6, comprising a step of deriving a correction signal.

C1.3.1. The method according to paragraph C1.3, wherein the step of deriving the correction signal includes comparing the image data with reference data relating to a reference position of the parisons relative to the conveyor and/or to the inspection station, wherein the correction signal is derived in response to the comparison between the image data and the reference data.

C1.3.2. The method according to paragraph C1.3, wherein the step of deriving the correction signal includes capturing a signal representing a position of the conveyor (or a part thereof) or of the inspection station (or a part thereof) relative to one or more parisons to be inspected, by means of one or more proximity sensors, wherein the correction signal is derived as a function of the signal captured by the one or more proximity sensors and of a reference position (stored in the database or in the memory).

C1.3.3. The method according to any one of paragraphs C1.3 to C1.3.2, comprising one or more of the following steps:
  driving the at least one conveyor adjustment actuator through the correction signal;
  setting the inspection station to an operating configuration in response to the correction signal;
  replacing the image data captured by the at least one inspection camera with an updated version, wherein the correction signal represents the updated version of the image data.

C2. The method according to any one of paragraphs C to C1.3.3, wherein, in the first operating configuration of the apparatus, the conveyor is in a first operating configuration to transport parisons of the first size and, in the second operating configuration of the apparatus, the conveyor is in a second operating configuration to transport parisons of the second size, wherein the step of moving the apparatus includes moving the conveyor.

C3. The method according to any one of paragraphs C to C2, wherein, in the first operating configuration of the apparatus, the inspection station is in a first operating configuration to see parisons of the first size and, in the second operating configuration of the apparatus, the inspection station is in a second operating configuration to see parisons of the second size, wherein the step of moving the apparatus includes moving the inspection station.

C3.1. The method according to paragraph C3, wherein, in the first operating configuration of the inspection station, the at least one inspection camera is at a first position, and, in the second operating configuration of the inspection station, the at least one inspection camera is at a second position, different from the first position.

C4. The method according to any one of paragraphs C to C3.1, wherein the step of moving includes moving the conveyor and/or the inspection station by means of a plurality of adjustment actuators controlled synchronously.

C5. The method according to any one of paragraphs C to C4, wherein each parison includes a body, a thread and a flange, wherein the thread defines an open annular end, the body extends between the thread and a closed bottom, defining an internal cavity, and the flange projects radially from the body, wherein the conveyor includes one or more of the elements listed below:
  a pair of guides configured to support the parisons by holding them up by the flange, wherein the guides of the pair are movable towards and away from each other to vary the distance between them;
  a pair of body guides configured to contact an outside wall of the parison body, wherein the body guides of the pair are movable towards and away from each other to vary the distance between them;
  a feed channel, above the pair of under-flange guides, configured to convey a jet of air to cause the parisons to advance along the under-flange guides of the pair, wherein the feed channel is movable along a vertical direction, at right angles to the pair of guides, towards and away from the pair of guides;
  a pair of feed belts, configured to contact the outside of the parison body to cause the parisons to advance along the guides of the pair, wherein the feed belts of the pair are movable towards and away from each other to vary the distance between them;
  a suction belt, configured to advance along a feed direction and to contact the open annular end of the parisons and to create a negative pressure in the internal cavity of the parisons, so as to support and move them in the feed direction, wherein the suction belt is movable along the vertical direction, wherein the step, of moving includes moving at least one of the components of the conveyor to define the first and second operating configurations.

The invention claimed is:

1. A method for optical inspection of parisons, comprising the following steps:
   conveying the parisons to be inspected in succession along an inspection path, by means of a conveyor;
   capturing image data of a parison positioned in an inspection station by means of at least one inspection camera;
   moving the conveyor, by means of at least one adjustment actuator, between a first operating configuration, where the conveyor transports parisons of a first size, and a second operating configuration, where the conveyor transports parisons of a second size, different from the first size;
   wherein the step of moving the conveyor comprises the following sub-steps, carried out through a control unit:
   capturing an image of one of the parisons to be inspected by means of a recognition camera;
   deriving input data, representing a size of the parisons to be inspected, as a function of the image captured by the recognition camera;
   processing the input data and deriving, as a function of the size of the parisons to be inspected, a setting dataset defining a corresponding operating configuration of the conveyor;
   generating an adjustment signal as a function of the setting dataset,
   sending the adjustment signal to the at least one adjustment actuator of the conveyor.

2. The method according to claim 1, comprising a step of setting the inspection station to a respective operating configuration, as a function of the size of the parisons.

3. The method according to claim 1, wherein the conveyor includes a plurality of adjustment actuators and wherein a control unit is provided, wherein the control unit synchronously controls the plurality of adjustment actuators of the conveyor.

4. The method according to claim 1, wherein the inspection station includes a plurality of adjustment actuators, and wherein a control unit is provided, wherein the control unit synchronously controls the plurality of adjustment actuators of the inspection station.

5. An apparatus for optical inspection of parisons made of thermoplastic material, comprising:
   a conveyor configured to transport the parisons in succession along an inspection path;
   an inspection station, located along the inspection path and including at least one inspection camera, configured to capture image data of a parison positioned in the inspection station,
   wherein the conveyor has a first operating configuration for transporting parisons of a first size and a second operating configuration for transporting parisons of a second size, different from the first size, the conveyor including at least one adjustment actuator, configured to move the conveyor between the first and the second operating configuration, wherein the inspection station can be set to a first operating configuration to inspect the parisons of the first size, wherein, in the first operating configuration of the inspection station, the at least one inspection camera is at a first position, and to a second operating configuration to inspect the parisons of the second size, wherein, in the second operating configuration of the inspection station, the at least one inspection camera is at a second position, different from the first position, wherein the apparatus comprises an inspection station movement system, configured to move said at least one inspection camera between the first position and the second position.

6. A method for optical inspection of parisons, comprising the following steps:
   conveying the parisons to be inspected in succession along an inspection path, by means of a conveyor;
   capturing image data of a parison positioned in an inspection station by means of at least one inspection camera;
   moving the conveyor, by means of at least one adjustment actuator, between a first operating configuration, where the conveyor transports parisons of a first size, and a second operating configuration, where the conveyor transports parisons of a second size, different from the first size,
   the method comprising a step of setting the inspection station to a respective operating configuration, as a function of the size of the parisons.

7. A method for optical inspection of parisons, comprising the following steps:
   conveying the parisons to be inspected in succession along an inspection path, by means of a conveyor;
   capturing image data of a parison positioned in an inspection station by means of at least one inspection camera;
   moving the conveyor, by means of at least one adjustment actuator, between a first operating configuration, where the conveyor transports parisons of a first size, and a second operating configuration, where the conveyor transports parisons of a second size, different from the first size, wherein the inspection station includes a plurality of adjustment actuators, and wherein a control unit is provided, wherein the control unit synchronously controls the plurality of adjustment actuators of the inspection station.

8. An apparatus for optical inspection of parisons made of thermoplastic material, comprising:
   a conveyor configured to transport the parisons in succession along an inspection path;
   an inspection station, located along the inspection path and including at least one inspection camera, configured to capture image data of a parison positioned in the inspection station,
   wherein the conveyor has a first operating configuration for transporting parisons of a first size and a second operating configuration for transporting parisons of a second size, different from the first size, the conveyor including at least one adjustment actuator, configured to move the conveyor between the first and the second operating configuration,
   wherein each parison includes a body, a thread, wherein the thread defines an open annular end, the body extends between the thread and a closed bottom, defining an internal cavity, wherein the conveyor includes one or more of the elements listed below:
   a pair of body guides configured to contact an outside wall of the body of the parisons wherein the body guides of the pair are movable towards and away from each other to vary the distance between them;
   a feed channel, above the under-flange guides, configured to convey a jet of air to cause the parisons to advance along the under-flange guides of the pair, wherein the feed channel is movable along a vertical direction, at right angles to the pair of guides, towards and away from the pair of guides;
   a pair of feed belts, configured to contact the outside of the body of the parisons to cause the parisons to advance along the guides of the pair, wherein the feed belts of the pair are movable towards and away from each other to vary the distance between them;
a suction belt, configured to advance along a feed direction and to contact the open annular end of the parisons and to create a negative pressure in the internal cavity of the parisons, so as to support and move them in the feed direction, wherein the suction belt is movable along the vertical direction,
wherein the adjustment actuator of the conveyor is configured to move at least one of the components of the conveyor to define the first and the second operating configuration.

* * * * *